(12) United States Patent
Almarhoon et al.

(10) Patent No.: US 10,120,090 B2
(45) Date of Patent: *Nov. 6, 2018

(54) EVALUATION OF ROCK BOUNDARIES AND ACOUSTIC VELOCITIES USING DRILL BIT SOUND DURING VERTICAL DRILLING

(71) Applicant: Saudi Arabian Oil Company, Dhahran (SA)

(72) Inventors: Maher I. Almarhoon, Qateef (SA); Yunlai Yang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 16 days.

This patent is subject to a terminal disclaimer.

(21) Appl. No.: 15/430,923

(22) Filed: Feb. 13, 2017

(65) Prior Publication Data
US 2017/0153343 A1  Jun. 1, 2017

Related U.S. Application Data

(63) Continuation of application No. 14/505,335, filed on Oct. 2, 2014, now Pat. No. 9,568,629.

(51) Int. Cl.
*G01V 1/30* (2006.01)
*E21B 47/00* (2012.01)
(Continued)

(52) U.S. Cl.
CPC .............. *G01V 1/306* (2013.01); *E21B 47/00* (2013.01); *E21B 47/01* (2013.01); *E21B 47/16* (2013.01);
(Continued)

(58) Field of Classification Search
CPC . G01V 1/306; G01V 1/44; G01V 1/50; G01V 1/40; G01V 2210/62;
(Continued)

(56) References Cited

U.S. PATENT DOCUMENTS

| 5,678,643 A | 10/1997 | Robbins et al. |
| 5,753,812 A | 5/1998 | Aron et al. |

(Continued)

FOREIGN PATENT DOCUMENTS

| EP | 117280 | 4/1990 |
| EP | 294158 | 12/1993 |

(Continued)

OTHER PUBLICATIONS

Gulf Cooperation Council Office Action issued in GCC Application No. GC 2015-30118 dated Feb. 22, 2018, 3 pages.
(Continued)

*Primary Examiner* — Daniel L Murphy
(74) *Attorney, Agent, or Firm* — Fish & Richardson P.C.

(57) ABSTRACT

Implementations provide identification of rock boundaries and evaluation of rock interval velocities in subterranean zones. Actions can include receiving acoustic signals associated with sounds produced by a well tool implemented to perform a well operation by contacting a portion of a subterranean zone, the acoustic signals being composed of source acoustic signals and reflected acoustic signals produced in response to the source acoustic signals, processing the acoustic signals to determine the source acoustic signals and the reflected acoustic signals and determining properties of the subterranean zone based on the source acoustic signals and the reflected acoustic signals.

20 Claims, 17 Drawing Sheets

(51) Int. Cl.
*E21B 49/00* (2006.01)
*G01V 1/44* (2006.01)
*E21B 47/01* (2012.01)
*E21B 47/16* (2006.01)
*G01V 1/50* (2006.01)
*G01V 1/40* (2006.01)

(52) U.S. Cl.
CPC .............. *E21B 49/003* (2013.01); *G01V 1/44* (2013.01); *G01V 1/50* (2013.01); *G01V 1/40* (2013.01); *G01V 2200/16* (2013.01); *G01V 2210/62* (2013.01)

(58) Field of Classification Search
CPC ... G01V 2200/16; E21B 47/00; E21B 49/003; E21B 47/01; E21B 47/16
USPC .......................................................... 367/25
See application file for complete search history.

(56) References Cited

U.S. PATENT DOCUMENTS

| | | | |
|---|---|---|---|
| 6,382,332 | B1 | 5/2002 | Eaton |
| 6,988,566 | B2 | 1/2006 | Lockerd, Sr. et al. |
| 7,289,909 | B2 | 10/2007 | Thomamnn et al. |
| 7,404,456 | B2 | 7/2008 | Weaver et al. |
| 9,568,629 | B2 * | 2/2017 | Almarhoon ............. E21B 47/01 |
| 2011/0266058 | A1 | 11/2011 | Kumar et al. |
| 2013/0075160 | A1 | 3/2013 | Yang |
| 2013/0080060 | A1 | 3/2013 | Yang |
| 2013/0080065 | A1 | 3/2013 | Yang |

FOREIGN PATENT DOCUMENTS

| | | |
|---|---|---|
| WO | WO 2013049014 | 4/2013 |
| WO | WO 2013049111 | 4/2013 |
| WO | WO 2013049140 A2 | 4/2013 |

OTHER PUBLICATIONS

International Search Report and Written Opinion of the International Searching Authority issued in International Application No. PCT/US2015/053405 dated Jan. 25, 2016; 12 pages.

Masood, Harsha et al.; "A Critical Review on Estimation of Rock Properties Using Sound Levels Produced during Rotary Drilling"; International Houma of Eart Sciences and Engineering; Dec. 2012; pp. 1809-1814.

Rector III, JW et al.; "Radiation Pattern and Seismic Waves Generated by a Working Roller-Cone Drill Bit"; Geophysics; Society of Exploration Geophysicists; vol. 57, No. 10; Oct. 1992; pp. 1319-1333.

Soma, Nobukazu et al.; "Trial of Coal Seam Imaging by Cross Correlation Analysis of Drilling Noise at Open-Pit Mine Based on Single Point 3C Downhole Observation"; Proceedings of the 11th SEGJ International Symposium; Yokohama, Japan; Nov. 18-21, 2013; pp. 302-306.

Zborovjan, Martin et al.; "Acoustic Identification of Rocks during Drilling Process"; Acta Montanistica Slovaca; Dec. 1, 2003; pp. 191-193.

Gulf Cooperation Council issued in GCC Application No. GC 2015-30118 dated Jul. 9, 2018, 3 pages.

* cited by examiner

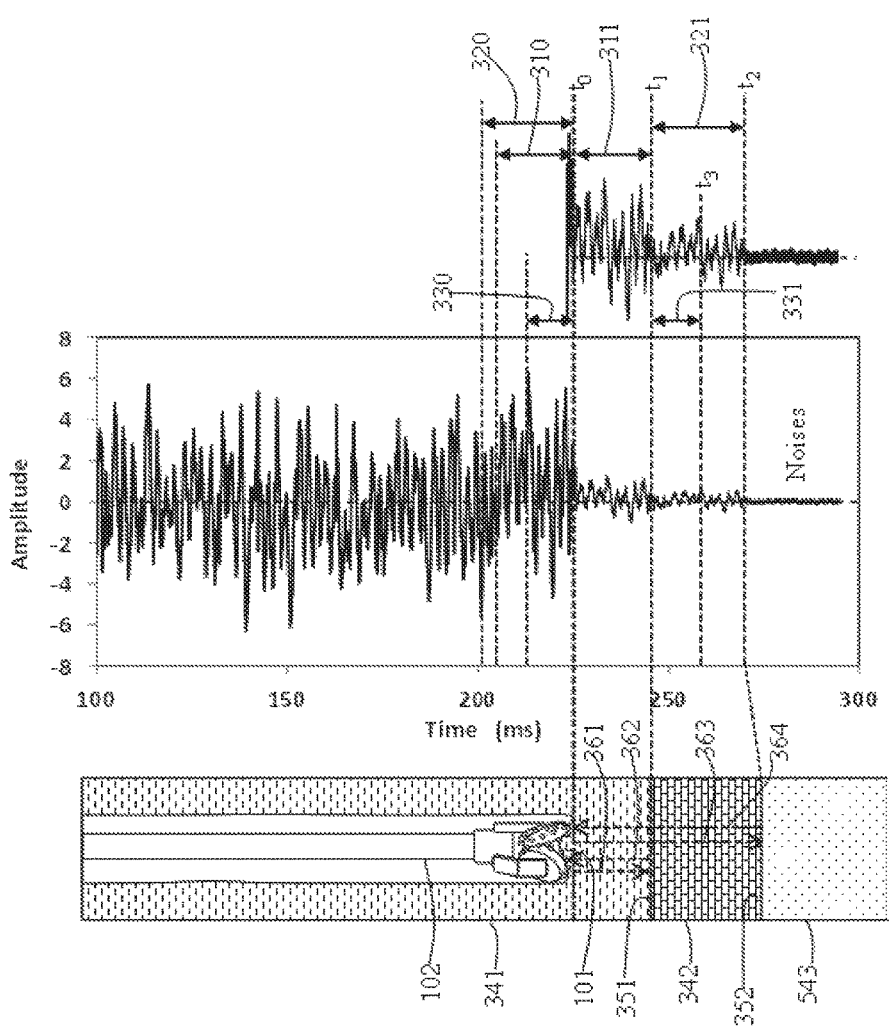

EVALUATION OF ROCK BOUNDARIES AND ACOUSTIC VELOCITIES USING DRILL BIT SOUND DURING VERTICAL DRILLING

CROSS-REFERENCE TO RELATED APPLICATIONS

This application is a Continuation of and claims the benefit of priority to U.S. application Ser. No. 14/505,335, filed on Oct. 2, 2014, the contents of which are hereby incorporated by reference.

TECHNICAL FIELD

This disclosure relates to the field of planning wellbore drilling methods and apparatus.

BACKGROUND

Determination of rock boundaries below drill bit are useful in helping drill planning, such as deciding the optimum location of casing shoes. Rock acoustic velocity is an important parameter in seismic data processing and interpretation. Conventionally, rock boundaries and rock acoustic velocity are determined with a technique, known as vertical seismic profiling (VSP), using an external seismic source and seismic listening devices (geophones) attached to the casing wall. The installation of geophones and the VSP measurement can require drilling suspension for significant periods of time. Long stops or breaks of drilling can significantly increase the cost of the drilling operation in addition to the cost of the actual profiling operation.

Some systems that attempt to make the measurement without drilling breaks use the drill bit sound as the seismic source and an array of geophones that arranged on the surface to record the sound transmitted from the drill bit. Unlike seismic source used in seismic methods, the drilling bit sound is not impulsive, rather it is continuous. As such, the information recorded by the geophones is a mixture of drill sound transmitted directly from the source (drill bit) and the sounds reflected from rock boundaries. It would be useful to find a method that separates the direct drill sound and the reflected ones in order to determine the location of the rock boundaries below drill bit. Furthermore, the drill sound significantly attenuates within rock formations with distance, affecting the quality of the transmission to the receivers placed on the ground surface.

SUMMARY

This disclosure describes methods for identification of rock boundaries and evaluation of rock interval velocities in subterranean zones. In some examples, methods include actions of receiving acoustic signals associated with sounds produced by a well tool implemented to perform a well operation by contacting a portion of a subterranean zone. The acoustic signals are composed of source acoustic signals and reflected acoustic signals produced in response to the source acoustic signals. The methods further include actions of processing the acoustic signals to determine the source acoustic signals and the reflected acoustic signals and determining properties of the subterranean zone based on a correspondence between the source acoustic signals and the reflected acoustic signals. The well tool is a drilling tool to drill the subterranean zone. The sound is produced before a pause of the well operation.

In some implementations, the method further includes the operation of receiving a sampling command generated by a sampling module. The sampling command includes a start time for starting a recording of the acoustic signal, an end time for ending the recording of the acoustic signal and a sampling rate, the start time being before the pause and the end time being after the pause. The start time can be a minute before the drilling pause. The end time can be 2 seconds after the drilling pause. The drilling pause can be associated with a drilling operation performed independently from a recording of the drilling acoustic signal. The properties of the subterranean zone include depths of rock boundaries and acoustic rock velocities.

In some implementations, determining properties of the subterranean zone includes determining a plurality of two-way travel times corresponding to a propagation of the sound from the well tool, to a plurality of rock boundaries and back to the well tool. Determining the plurality of two-way travel times includes the operations of determining a plurality of time boundaries by processing the acoustic signal with a time boundary function, determining a plurality of sections of the reflected acoustic signal based on the plurality of time boundaries and processing the plurality of reflected signal sections with a two-way travel time function to provide the two-way travel times.

In some implementations, the time boundary function includes determining a plurality of window moving averages, each of the plurality of window moving averages corresponding to a sequential section of the acoustic signal, determining a slope of an amplitude of the acoustic signal based on the plurality of window moving averages, identifying that each of time boundaries can be determined and based on identifying that each of the time boundaries can be determined, determining each of the time boundaries by sequentially identifying local maxima of the slope. Each of the plurality of window moving averages includes an average amplitude of the sequential section of the acoustic signal.

In some implementations, the two-way travel time function includes: selecting a corresponding direct signal section within the source acoustic signal, selecting a screening window within the reflected acoustic signal, selecting a screening range within the direct acoustic signal, screening the screening range using the screening window, to determine a plurality of correlation coefficients and identifying a largest correlation coefficient of the plurality of correlation coefficients. The largest correlation coefficient is compared to a threshold to determine if the decided time boundary by the time boundary function is a real one. Determining the plurality of two-way travel times can be based on an assumption that the reflected acoustic signal is associated with a vertical propagation path. Each of the plurality of two-way travel times is associated with depths of rock boundaries. At least one of the depths of the rock boundaries is below a location of the well tool, the reflected acoustic signal being generated by a reflection on one of the rock boundaries. In some implementations, the method further includes determining acoustic rock velocities based on the plurality of two-way travel times.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A illustrates an example of rock layers under drilling and rock boundaries.

FIGS. 3B and 3C illustrate example drilling acoustic signals.

Like reference numbers and designations in the various drawings indicate like elements.

DETAILED DESCRIPTION

Figure 1A:
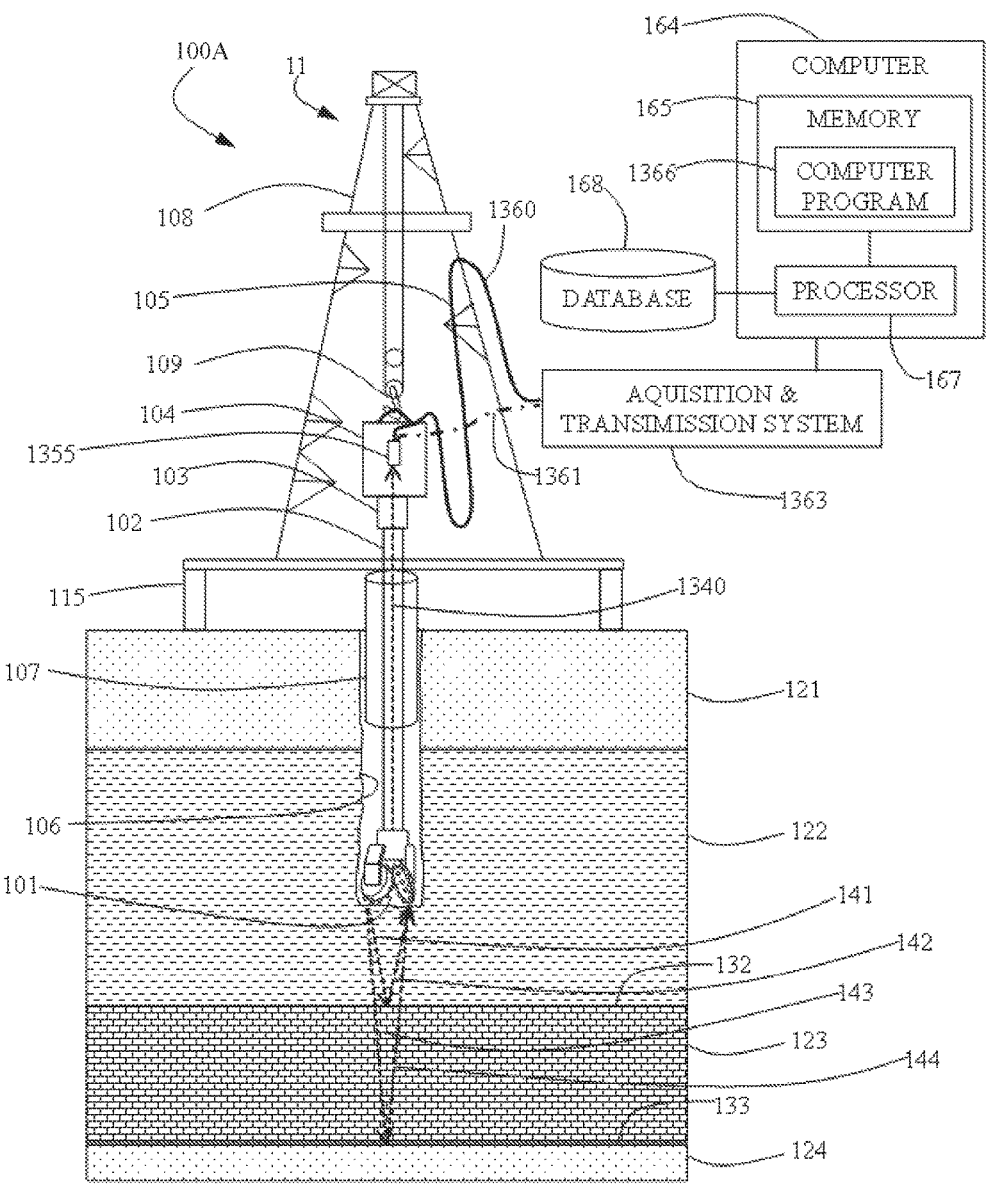
FIGS. 1A-1D illustrate examples of drill bit sound recording and analysis systems for detecting rock boundaries and evaluating rock acoustic velocities in real-time during drilling.

This disclosure describes a method for assisting planning of drilling within wellbores. In particular, this disclosure describes the detection of rock properties including rock boundaries ahead of a drill bit and rock acoustic velocities using drill bit sound during drilling operation without interruption of the drilling. Wellbore drilling for such purposes as petroleum extraction includes rotating a drill bit within a subterranean formation. During wellbore drilling, acoustic sounds are generated by the drill bit engaging the subterranean formation. The generated sounds are termed as drilling acoustic signals hereafter. A part of the drilling acoustic signals is transmitted upward along the drill string and is termed "direct drilling acoustic signals." A part of the drilling acoustic signals is transmitted downwards into the subterranean formation. The subterranean formation includes layers of rock characterized by particular physical properties (e.g., porosity, water saturation, permeability, etc.) forming regions with different acoustic properties. At the incidence on a rock boundary, a part of the downward transmitted drilling acoustic signals are reflected and the rest propagates through the rock layer. Some of the reflected drilling acoustic signals collide with the drill bit and are transmitted upwards along the drill string. The part of the drilling acoustic signals that are transmitted by the drill string after the reflection on a rock boundary is termed "reflected drilling acoustic signals." Generally, the term "drilling acoustic signals" includes both direct drilling acoustic signals and reflected drilling acoustic signals.

In the implementations, the method of detecting rock boundaries and rock acoustic velocities includes the analysis of direct and reflected drilling acoustic signals recorded within a period of a few seconds to 1 minute around the time at which the drilling is paused. The recording of the drilling acoustic signals can be synchronized with regular pauses of the drilling process, since the regular pauses are long enough to record enough reflected drilling acoustic signals. For example, when a top drive drilling rig is used, drilling is usually paused at every 30 meters drilling for adding new drill pipes to the drill string. When drilling is paused, the last produced drill sound travels downwards, it reflects from the rock boundaries back to the drill bit and then it propagates upwards along the drill string.

The drilling acoustic signals recorded in synchronization with the drilling pause are processed to separate the direct drilling acoustic signals from the reflected drilling acoustic signals and to separate reflected drilling acoustic signals reflected from each rock boundaries. The rock boundaries' depth under the drill bit and acoustic rock velocities are then calculated from the separated drilling acoustic signals. The recording of the drilling acoustic signals synchronized with regular pauses (e.g., the pauses used for adding new drill pipes), does not incur an interruption of the regular drilling process.

In addition to the regular pauses, drilling can be paused intentionally for a few seconds to perform one or more measurements. Even in this case, the interruption to the drilling is insignificant since the pause time is extremely short. When this method is applied, the rock boundaries are detected and rock acoustic velocities are calculated in real time during drilling. The derived real time information is helpful in drilling planning, such as deciding the optimum location of casing shoes. The cost of the implementation of this method is very low. The low cost enables the procedure to be implemented on normal well drillings and thus large volume of rock acoustic velocity data can be economically collected. The large volume acoustic velocity data enhances seismic data process and interpretation.

FIGS. 1A-1D are schematic diagrams of example drill bit sound recording and analysis systems 100A, 100B, 100C and 100D, respectively for identifying rock boundaries and evaluating rock acoustic velocities in real-time during drilling in a subterranean formation. The example systems 100A, 100B, 100C and 100D include an acoustic signal recording system and an acquisition and transmission system attached to a top drive drilling rig 11. The top drive drilling rig 11 includes a top drive 104 that is the central component of the rig 11. The top drive 104 is suspended in the derrick 108 by a traveling block 109. In the center of the top drive 104, there is a drive shaft 103, which is connected to the top pipe of the drill string 102 by threads. The top drive 104 rotates the drive shaft 103. The rotation is transmitted to the drill string 102 and the drill bit 101 that drills the rock at the bottom of the borehole (well) 106. A portion of the top part of the borehole 106 can be protected by casing 107. The power cable supplying electric power to the top drive 104 is within the service loops 105.

In drilling operation, the drill bit 101 generates drilling acoustic signals that are partly transmitted downwards through rock layers, such as rock layers 122, 123, and 124, as illustrated in FIGS. 1A-1D. When the drilling acoustic signals 141 intercept a rock boundary 132 between the rock layer 122 and rock layer 123, a part of the drilling acoustic signals is reflected back to the drill bit 101 along the path 142. A part of the drilling acoustic signals 143 propagates further deep downward though the rock layer 123 to the boundary between rock layers 123 and 124, where a part of the drilling acoustic signals is reflected back along the path 144 to reach to the drill bit 101. The drill bit can detect both the direct and the reflected drilling acoustic signals transmitted upwards along the drill string 102.

Figure 1B:
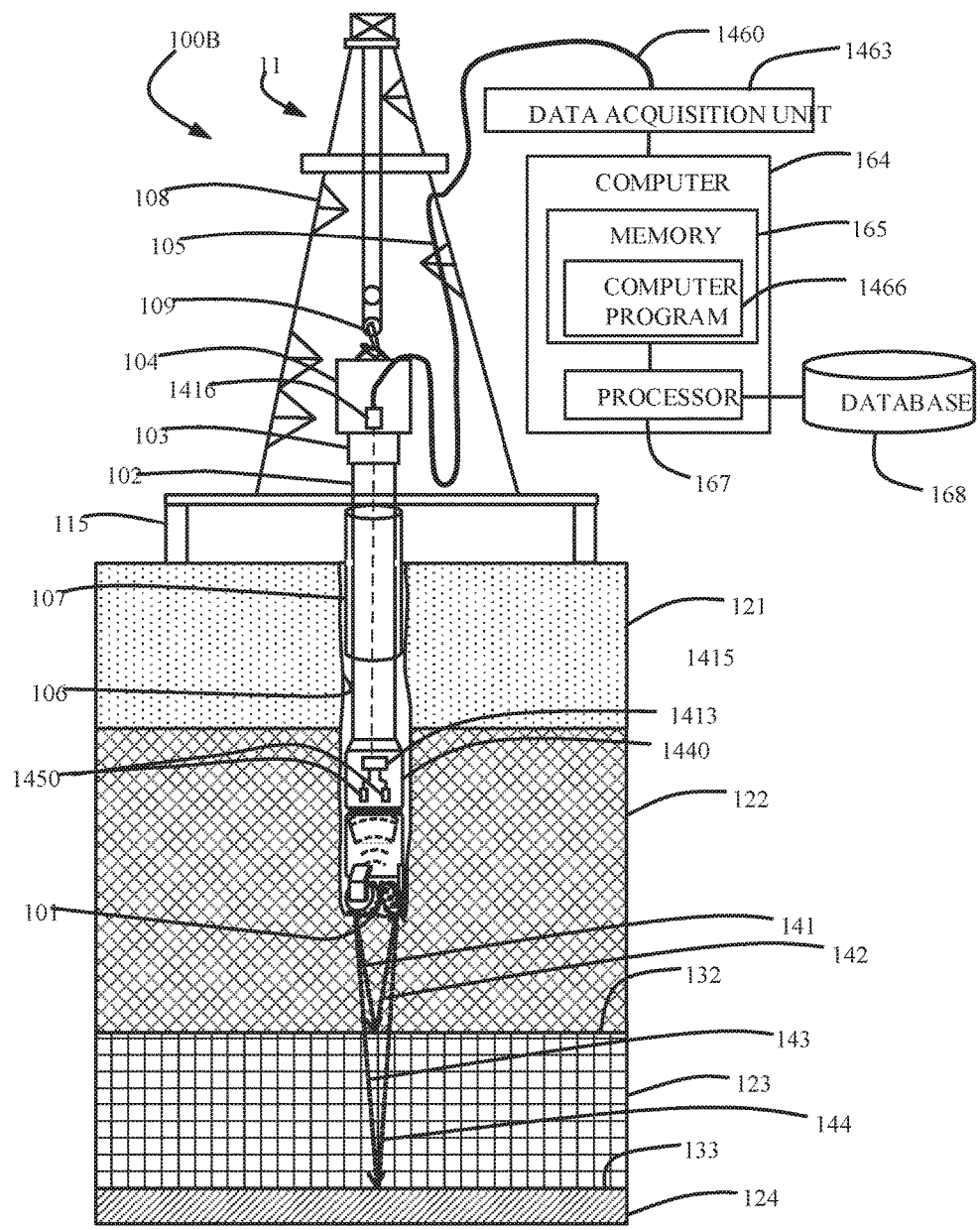
Figure 1C:
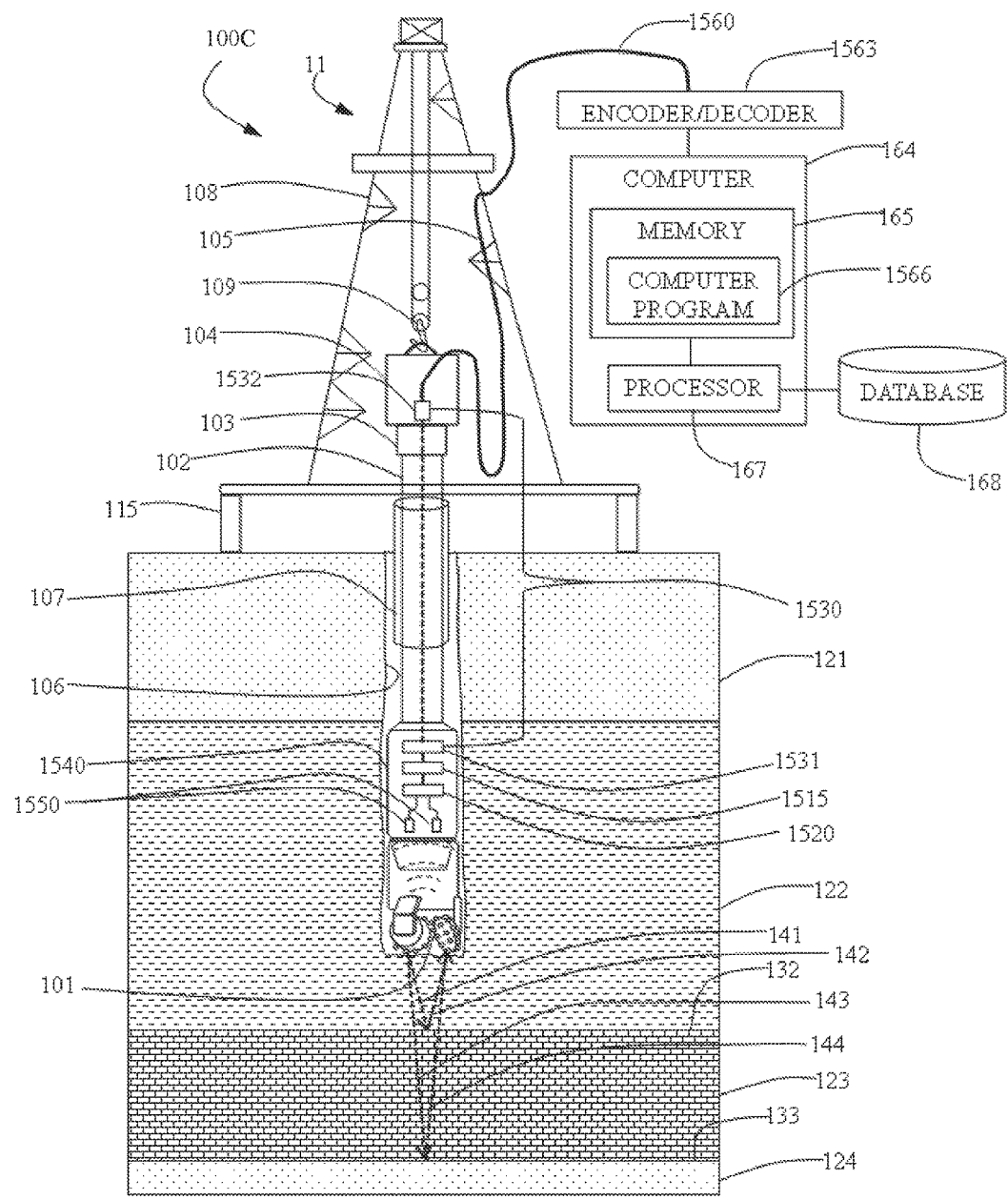

The example systems 100A, 100B, 100C and 100D include acoustic sensors that can pick up (or detect) drilling acoustic signals. In some implementations, as illustrated in FIG. 1A, the example systems 100A includes one acoustic sensor 1355 positioned on a top drive 104 to pick up the drilling acoustic signals which transmit from the drill bit upwards along the drill string 102. In some implementations, as illustrated in FIG. 1B, the example systems 100B includes a set of acoustic sensors 1450 that are contained in a downhole sensor subassembly 1440, which is positioned above a drill bit 101 and is connected to a drill string 102. The drilling acoustic signals are picked up by the sensors 1450 when they transmit up from the drill bit. The set of acoustic sensors 1450 can be attached to a downhole broadband system that is composed of three major parts: the downhole data transmission interface 1413, a borehole broadband data transmission system 1415, and a surface data "transmission" interface 1416, which is located at the stationary part of the top drive 104. In some implementations, as illustrated in FIG. 1C, the example systems 100C includes a set of acoustic sensors 1550 that are contained in a downhole sensor subassembly 1540, which is positioned above a drill bit 101 and is connected to a drill string 102.

Each acoustic sensor 1355, 1450 and 1550 can be a single or a group of acoustic sensors. Different types of acoustic sensors, such as, for example, accelerometers, measurement microphones, contact microphones or any other type of acoustic transducers can be configured to pick up the acoustic signals. The acoustic sensors can generate an analogue or a digital output signal. Each acoustic sensor either has a built-in amplifier or can be connected directly to an amplifier. The drilling acoustic signals can be amplified after they are received by the acoustic sensors. W.O. Patent Application Pub. No. WO 2013049014 A2 filed Sep. 25, 2012 and titled "Apparatus for evaluating rock properties while drilling using drilling rig-mounted acoustic sensors," W.O. Patent Application Pub. No. WO 2013049111 A2 filed Sep. 26, 2012 and titled "Apparatus, computer readable medium, and program code for evaluating rock properties while drilling using downhole acoustic sensors and telemetry system", and W.O. Patent Application Pub. No. WO 2013049140 A2, filed Sep. 26, 2012 and titled "Apparatus, computer readable medium, and program code for evaluating rock properties while drilling using downhole acoustic sensors and a downhole broadband transmitting system," which are hereby incorporated in full by reference, provide further details about locations and method of attachment of acoustic sensors.

Drilling acoustic signals picked up by the acoustic sensors 1355, 1450 and 1550 are transmitted to a computer 164 by a data acquisition and transmission system. A data acquisition and transmission system includes multiple parts, such as a data transmission system and a data acquisition unit, to perform functions, such as amplifying the signals if necessary, sampling and digitizing the analogue signals into digit format by the data acquisition unit, and transmitting the digitized signals to the computer 164. As illustrated in FIG. 1A, the acquisition and transmission system 1363 of the example system 100A includes a wired transmission network 1360 or a wireless transmission network 1361 and a data acquisition unit. The drilling acoustic signals transmitting upwards along the path 1340 are picked up by the acoustic sensor 1355 are sampled, the analogic output is digitized and transmitted to the computer 164 by the acquisition and transmission system 1363.

As illustrated in FIG. 1B, the data acquisition and transmission system of the example system 100B can include a borehole broadband transmission system and a data acquisition unit 1463. The borehole broadband transmission system is composed of three major parts: a downhole data transmitting interface 1413, a broadband system 1415, and a surface data transmitting interface 1416, which is located at the stationary part of the top drive 104. The surface data transmitting interface 1416 is connected to the data acquisition unit 1463 by an electronic cable 1460, which is protected inside a service loop 105. The data acquisition unit 1463 is connected to the computer 164. The acoustic sensors 1450 are connected to the downhole data transmitting interface 1413. The acoustic sensors 1450 and the downhole data transmitting interface 1413 are contained in a downhole sensor subassembly 1440. The drilling acoustic signals transmitted upwards are picked up by the acoustic sensors 1450 and are transmitted to the data acquisition unit 1463 by broadband transmission system. The data acquisition unit 1463 samples and digitizes the received drilling acoustic signals and then transmits the digitized drilling acoustic signals to the computer 164.

As illustrated in FIG. 1C, the data acquisition and transmission system of the example system 100C can include a processor assembly 1520, two encoder/decoder systems 1515 and 1563, and a conventional borehole telemetry system 1530. According to the example system 100C, illustrated in FIG. 1C, the acoustic sensors 1550, the processor assembly 1520, the borehole encoder/decoder 1515 and a downhole interface 1531 of the borehole telemetry system 1530 can be contained within a downhole sensor subassembly 1540, which is positioned above a drill bit 101 and is connected to a drill string 102. The acoustic sensors 1550 are connected to the processor assembly 1520. The drilling acoustic signals transmitting upwards are picked up by the acoustic sensors 1550 and are transmitted to the data acquisition and transmission system. The data acquisition and transmission system samples, digitizes and processes the received drilling acoustic signals and then transmits the results to the computer 164.

W.O. Patent Application Pub. No. WO 2013049014 A2 filed Sep. 25, 2012 and titled "Apparatus for evaluating rock properties while drilling using drilling rig-mounted acoustic sensors," W.O. Patent Application Pub. No. WO 2013049111 A2 filed Sep. 26, 2012 and titled "Apparatus, computer readable medium, and program code for evaluating rock properties while drilling using downhole acoustic sensors and telemetry system", and W.O. Patent Application Pub. No. WO 2013049140 A2 filed Sep. 26, 2012 and titled "Apparatus, computer readable medium, and program code for evaluating rock properties while drilling using downhole acoustic sensors and a downhole broadband transmitting system," which are hereby incorporated in full by reference, provide further details about the setup of the acquisition and transmission system.

Figure 1D:
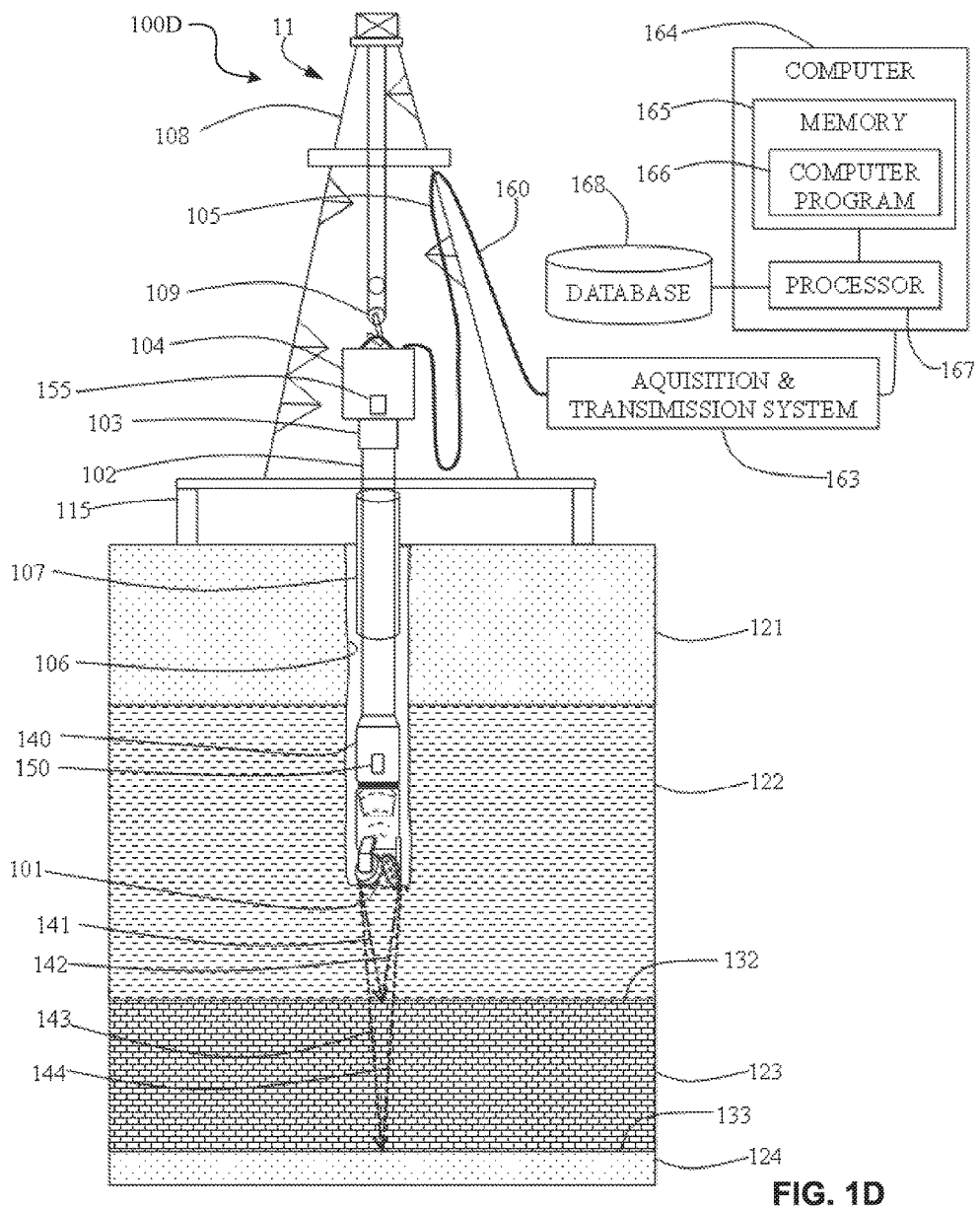

FIG. 1D illustrates the diagram of an example system 100D for identifying rock boundaries and evaluating rock acoustic velocities in real-time during drilling in a subterranean formation. The example system 100D is the representative summary of the systems 100A, 100B and 100C illustrated in FIGS. 1A-1C. In the example system 100D, the acoustic sensor 155 represents the sensor 1355 of the system 100A; the downhole acoustic sensor 150 represents the downhole sensors 1450 of the system 100B, or 1550 of the system 100C. The generic data "Acquisition and Transmission System" 163 of the example system 100D represents the data acquisition and transmission system 1363 of the system 100A (FIG. 1A), the data acquisition and transmission system of the system 100B, which is composed of a borehole broadband transmission system and a data acquisition unit 1463 (FIG. 1B), or the data acquisition and transmission system of the system 100C which can include a processor assembly 1520, two encoder/decoder systems 1515 and 1563, and a conventional borehole telemetry system 1530 (FIG. 1C). The generic "Rock Properties Analyzing Program" 166 of the example system 100D, installed in the computer 164, represents the rock properties analyzing program 1366 of the system 100A, or the rock properties analyzing program 1466 of the system 100B. For the system 100C (FIG. 1C), the generic rock properties analyzing program 166 is divided into two part. The first part is installed in the processor assembly 1520. The second part is a computer program 1566. For the convenience, the example system 100D of FIG. 1D is used to illustrate the method.

The digitized drilling acoustic signals and results, generated by the data acquisition and transmission system 163, are sent to the computer 164. The computer 164 can include various components such as, for example, an electronic processor 167, memory 165 contained within, carried by, or otherwise operably coupled with the electronic processor 167, and a rock properties analyzing program 166 stored therein, which can adapt the computer 164 to perform program functions. The digitized drilling acoustic signals are read by the rock properties analyzing program 166, stored in the memory 165 accessible to the processor 167 of the computer 164. The rock properties analyzing program 166 analyzes the drilling acoustic signals to determine two-way travel times, rock boundaries' depth, such as 132 and 133, ahead of drilling, and rock acoustic velocities in real time.

Figure 2:
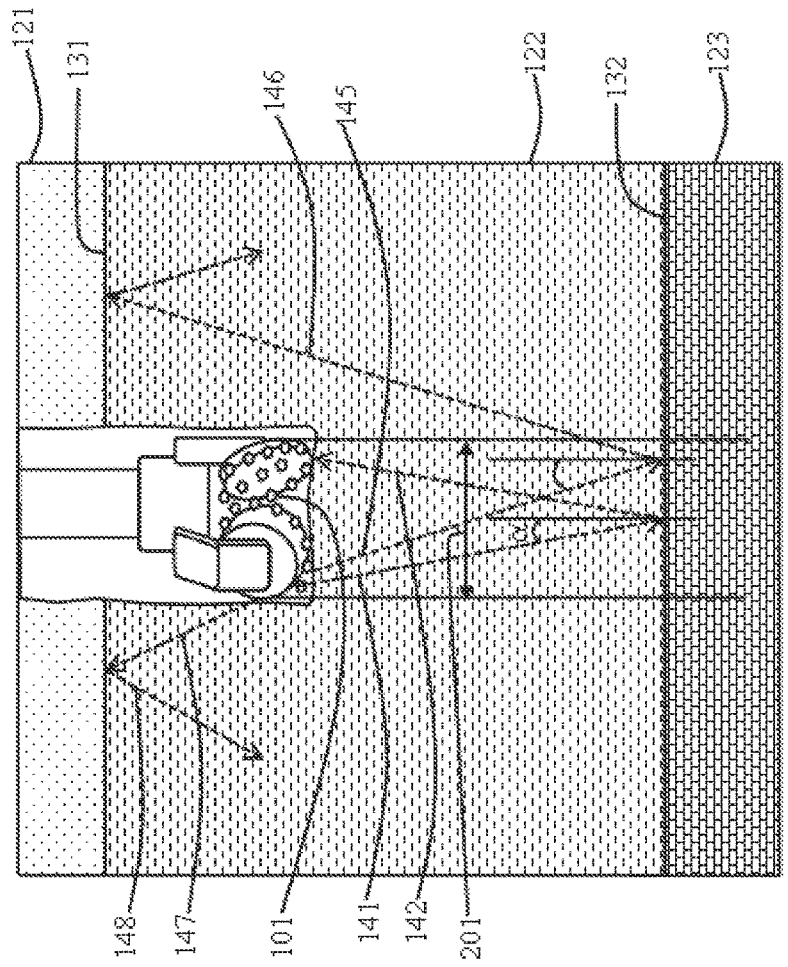
FIG. 2 illustrates an example portion of a system for measuring reflected drilling acoustic signals.

As schematically shown in FIG. 2, during vertical drilling, when the generated drilling acoustic signals are reflected by the rock boundaries, only the drilling acoustic signals with paths that are entirely within the projected area 201 of the drill bit 101 can be transmitted through the drill string 102 to be detected by the acoustic sensors. For example, the ray 142 which is the reflection of the ray 141 can reach to the drill bit 101 and thus can be transmitted along the drill string 102 to reach to the acoustic sensors (e.g., the acoustic sensors 150 and 155 illustrated in FIG. 1D). A substantial part of the reflected drilling acoustic signals with paths that are not entirely within the detection area 201 do not reach the drill bit 101 or the drill string and are not transmitted by the drill string 102 towards the sensors. For example, the path of the ray 146, which is the reflection of the ray 145, is partly outside the detection area 201, is transmitted away from the borehole and consequently, the ray 146 does not reach to the acoustic sensors 150 and 155. As another example, a ray 147 of drill bit sound, which transmits upwards at an angle, away from the vertical axis, is transmitted away from the drill string 102, and is not detected by the acoustic sensors 150 and 155. Based on the propagation trajectories of the drilling acoustic signals, during vertical drilling, the acoustic signals received by the acoustic sensors (e.g., the acoustic sensors 150 and 155 illustrated in FIG. 1D) are the direct drilling acoustic signals, and the reflected drilling acoustic signals detected by the drill bit, and noises.

During non-vertical drilling, i.e. when the drill string 102 is tilted, some reflected drilling acoustic signals are transmitted to the drill string, further transmitted to the acoustic sensors and are picked by the sensors. The drilling acoustic signals picked by the acoustic sensors are the mix of the signals detected by both the drill string 102 and the drill bit 101. Larger the tilting, lesser is the fraction of the drilling acoustic signals received by drill bit 101. Minimizing the tilting angle of the drill string 102, maximizes the fraction of the drilling acoustic signals received by the drill bit.

Referring to FIG. 1D, since the drill bit 101 is small relative to the distance between the drill bit and rock boundaries, the paths of the reflected drilling acoustic signals detected by the drill bit 101, such as the reflected signals 142 and 144 and the paths of the corresponding incident drilling acoustic signals, such as the signals 141 and 143, can be treated as vertical. The travel time of the drilling acoustic signals from the drill bit 101 to a rock layer boundary and back to the drill bit 101 can be treated as a two-way travel time.

The travel time of the drilling acoustic signals from the drill bit 101 to a rock layer boundary and back to the drill bit 101 generates a time lag between direct and reflected drilling acoustic signals. The time lag depends on the distance of the boundary from the drill bit and the acoustic velocity of the rock layers between the drill bit and the boundary. Considering the propagation of the drilling acoustic signals, the boundaries of the rock can be detected and the acoustic velocities of rock layers can be determined from time lags between the direct and reflected drilling acoustic signals. To calculate the time lags, the direct drilling acoustic signals and the reflected drilling acoustic signals corresponding to different rock boundaries need to be separated from each other. The time lag is the two-way travel time from the drill bit to the rock boundary.

During continuous drilling, such as before drilling is paused, the direct and reflected drilling acoustic signals are continuously detected by the acoustic sensors. The recorded drilling acoustic signals include the direct drilling acoustic signals overlapped by reflected drilling acoustic signals. Since the reflected signals are significantly smaller than the direct signals due to the acoustic signal attenuation during transmission through the rock layers, the recorded drilling acoustic signals before the drilling is paused are dominated by direct signals. The recorded drilling acoustic signals, before drilling is paused, can be treated as direct drilling acoustic signals.

During the process of drilling a well, drilling is paused from time to time to perform various drilling-associated operations. For example, if a top drive type drilling rig is used, drilling is paused after each 30 meters of drilling for adding new drill pipes to the drill string 102. Drilling can also be purposely paused in order to detect boundaries of rock layers and to evaluate acoustic velocities. The acoustic velocity within rock layers is normally in the range of 2000-6000 m/s. For a rock boundary located 1000 m below the drill bit, the two-way travel time is in the range of 0.3-1 s. A pause of one second allows the detection of drilling acoustic signals reflected from boundaries within 1000 m of the drill bit.

After drilling is paused or stopped, the drill bit stops generating drilling acoustic signals. After the drill bit stops generating drilling acoustic signals, the acoustic sensors can detect reflected drilling acoustic signals (e.g., the echo of the last sequence of generated drilling acoustic signals). The reflected drilling acoustic signals have similar frequency patterns to the last generated drilling acoustic signals, but with significantly lower amplitude due to attenuation, as illustrated in FIGS. 3A-3C. The direct and reflected drilling acoustic signals recorded before and after drilling is paused can be separated based on their characteristics.

FIGS. 3B and 3C illustrate an example record of drilling acoustic signals covering a very short time period (a few hundred milliseconds) around the time when the drilling is paused, which can be recorded by using the example systems, as illustrated in FIG. 1A-1C. FIG. 3A illustrates the correspondent rock layers and boundaries of the example signals. FIG. 3B is an example diagram of direct and reflected drilling acoustic signals in time domain format. FIG. 3C is a magnified view of a section of the example diagram illustrated in FIG. 3B, corresponding to the reflected drilling acoustic signals.

The direct drilling acoustic signals, which can be recorded during drilling an oil well, are illustrated as being recorded before a time marker $t_0$. That is the direct signal recorded at the time $t_0$ is the last generated drill bit sound. After the time marker $t_0$, the signals are the reflected ones, which can be generated by reflections on the rock boundaries 351 and 352. The time marker $t_0$ separates direct drilling acoustic signals from the reflected drilling acoustic signals. After the drilling is paused, the last generated drill bit sound transmits downwards following the path 361, to the first boundary 351 below the drill bit, where a part of its energy is reflected back. The reflected drilling acoustic signal transmits upwards along the path 362 to reach to the drill bit 101. From the drill bit 101, the reflected drilling acoustic signal transmits upwards to reach the acoustic sensors to be received. The time at which the last drilling acoustic signal reflected from the rock boundary 351 is recorded is denoted as $t_1$. The time marker $t_1$ corresponds to the first rock boundary 351 below the drill bit. The difference between the path of the last direct drill bit sound and the path of the corresponding reflected sound is the two way distance between the drill bit 101 and the boundary 351. The time difference between $t_1$ and $t_0$ (e.g., $t_1-t_0$) is the two-way travel time between the drill bit and the boundary 351.

The last generated drilling acoustic signal that reached the boundary 351 can be further transmitted across the boundary 351, along a path 363. At the incidence with the boundary 352, a part of the energy of the drilling acoustic signal is reflected back. The reflected drilling acoustic signal transmits upwards along a path 364 to reach the drill bit 101. From the drill bit 101 it transmits upwards to arrive to the acoustic sensors to be recorded. The time at which the drilling acoustic signal reflected by the boundary 352 is recorded is denoted as $t_2$. Thus the time marker $t_2$ corresponds to the second rock boundary 352 below the drill bit. The time difference between $t_2$ and $t_0$ (e.g., $t_2-t_0$) is the two-way travel time between the drill bit and the boundary 352. The time difference between $t_2$ and $t_1$ (e.g., $t_2-t_1$) is the two-way travel time of the rock layer 342, bounded between the boundary 351 and the boundary 352. The two-way travel time between the boundaries of a rock layer is termed "interval two-way travel time." For example $t_2-t_1$ is the interval two-way travel time of the rock layer 342.

The drilling acoustic signals attenuate during their downward transmission and subsequent reflections. Gradually the strength of the drilling acoustic signals is reduced to the noise level by the attenuation. It is difficult to use the recorded reflected drilling acoustic signals reduced to the noise level for the detection of rock boundaries. For example, as illustration in FIG. 3B, the record after the time $t_2$ is at the noise level. Any rock boundaries below the correspondent boundary 352 are more difficulty detected.

On a drilling acoustic signals record (as illustrated in FIG. 3B), the time at which the last reflected signal reflected from a rock boundary is recorded is termed "time boundary." For example $t_1$ is the time at which the last reflected signal reflected from the boundary 351 is recorded. The time marker $t_1$ represents a time boundary. The time marker $t_2$ represents another time boundary. Each time boundary corresponds to a rock boundary. For example, the time boundaries $t_1$ and $t_2$ correspond to the rock boundaries 351 and 352, respectively. In FIG. 3, $t_0$ is treated as a special time boundary, which corresponds to the position of the drill bit 101. The drilling acoustic signals generated before the drilling pause and reflected from a rock boundary are recorded before the corresponding time boundary. For example, drilling acoustic signals generated before the drilling pause and reflected from the rock boundary 351 are recorded before the corresponding time boundary $t_1$.

The reflected drilling acoustic signals (e.g., FIG. 3B), recorded by the acoustic sensors, are divided into sections by the time boundaries. A section is termed a "reflected signal section." Sections 311 and 321 are examples of reflected signal sections. The corresponding rock boundary of the lower time boundary of a reflected signal section is defined as a "corresponding rock boundary" of the section. For example, rock boundary 352 is the corresponding rock boundary of the reflected signal section 321. The lower time boundary of a reflected signal section marks the time at which the last drilling acoustic signal reflected from the corresponding rock boundary is recorded. The reflected signal sections below a time boundary do not contain signals reflected from this rock boundary. Within a reflected signal section, all the signals are reflected from the corresponding rock boundary and boundaries below it. For example, signals within the reflected signal section 311 are reflected from the corresponding rock boundary 351, lower boundary 352 and further lower boundaries. As another example, signals within the reflected signal section 321 are reflected from the corresponding rock boundary 352 and lower boundaries. There are no signals within the section 321 reflected from the corresponding upper rock boundary 351 or boundaries above the boundary 351.

Due to attenuation during drilling acoustic signal transmission, the contribution of the reflected drilling acoustic signals from lower boundaries to the drilling acoustic signals within a reflected signal section is minor. The drilling acoustic signals within a reflected drilling acoustic signal section are mainly the reflection of a "corresponding rock layer." Accordingly, each reflected signal section corresponds to a rock layer. For example, reflected signal section 311 and 321 corresponds to the rock layer between the drill bit 101 and rock boundary 351, and the rock layer 342, respectively.

Each reflected signal section has a corresponding "direct signal section." A "direct signal section" is a section from which the drilling acoustic signals reflected from the corresponding rock boundary are sourced. By definition, the time span of a direct signal section is the same as that of its corresponding reflected signal section. Since the corresponding direct signal of the last drilling acoustic signal in a reflected signal section is generated at the moment when the drilling is paused, the lower boundary of all direct signal sections is the time at which the last direct signal is recorded (e.g., $t_0$ in FIG. 3). A direct signal section can be decided by the time span, which is the same as that of its corresponding reflected signal section and the time $t_0$. For example, sections 310 and 320 are the corresponding direct signal sections of the reflected signal sections 311 and 321, respectively.

Drilling acoustic signals attenuate during their propagation through rock layers. The amplitude of the reflected drilling acoustic signals decreases with increasing depth of rock boundaries. In a drilling acoustic signal record, such as illustrated in FIG. 3B, the amplitude of direct signals is significantly higher than the amplitude of the reflected drilling acoustic signals. The amplitudes of the reflected drilling acoustic signals from an upper rock boundary are usually higher than the amplitudes of the reflected drilling acoustic signal from a lower rock boundary. The amplitudes of the reflected drilling acoustic signals can be used to estimate time boundaries, which divide a drilling acoustic signals record into reflected signal sections.

If a boundary is too deep, the strength of the corresponding reflected drill bit sound can be reduced to the background noise level, making the boundary not detectable. For example, boundary 352 in FIG. 3A represents the last detectable boundary. The drilling acoustic signal recorded after the time marker $t_2$ in FIGS. 3B and 3C is at the same level as the background noise. Any boundaries below the boundary 352 are not detectable. Based on the characteristics of drilling acoustic signals introduced in above paragraphs, the disclosed method for evaluating two-way travel times, detecting rock boundaries and calculating rock acoustic velocities are stated below.

The depth of boundaries below the drill bit and above the last detectable boundary can be determined based on the two-way travel times. Two-way travel times can be determined in two steps. First, a drilling acoustic signal record is divided into reflected signal sections. That is, time boundaries are determined to divide a drilling acoustic signals record into sections. Second, the two-way travel time of each corresponding rock boundary is determined based on the correlation between reflected signal section and its corresponding direct signal section.

In some implementations, the amplitude trend can be used to estimate time boundaries of a drilling acoustic signals record. The amplitude trend can be identified using a windowed moving average technique. The width of the window can be selected based on the reflected drilling acoustic signal characteristics in order to capture the general trend without capturing the local variations or the variation of the trend around time boundaries. For example, a window width covering 2 to 4 amplitude peaks of the reflected drilling acoustic signal can be used for detecting the amplitude trend of most reflected drilling acoustic signals. The peaks of amplitude trend slope (gradient), which corresponds to the most significant trend changes, can be used to locate time boundaries.

Figure 4A:
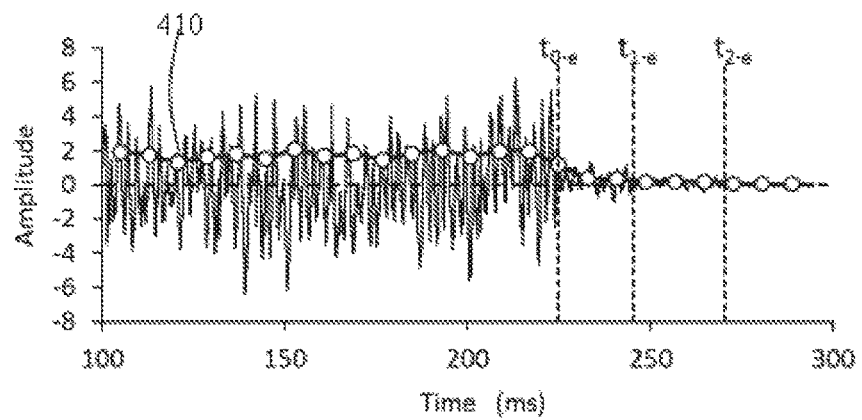
FIGS. 4A-4C illustrate example methods for estimating time boundaries.
Figure 4B:
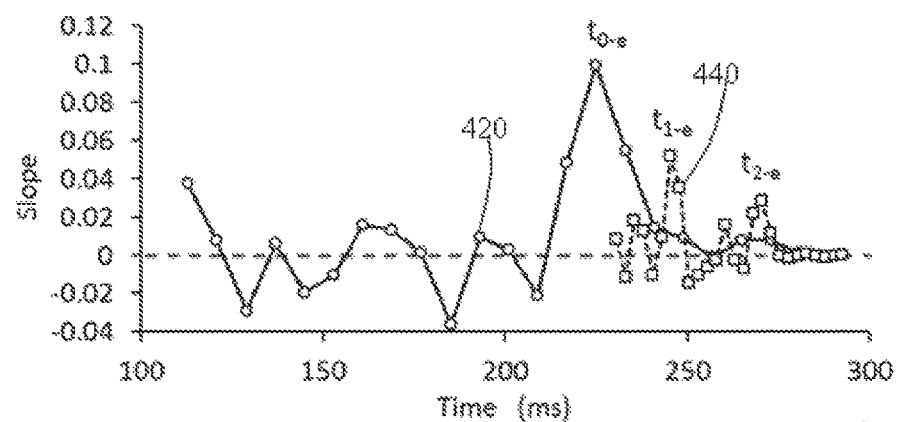
Figure 4C:
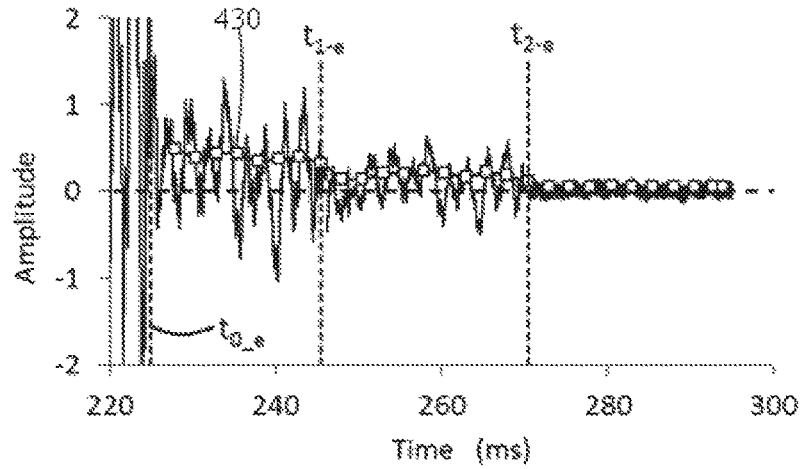

FIGS. 4A-4C illustrate example methods for estimating time boundaries by using windowed moving average technique. The example drilling acoustic signal illustrated in FIG. 4A corresponds to the example discussed with reference to FIG. 3B. FIG. 4C is a magnified view of the last portion of the drilling acoustic signal illustrated in FIG. 4A. In some implementations, the windowed moving averages and the time boundaries are iteratively determined. The windowed moving averages can be determined for the entire drilling acoustic signal record by using a relative large window.

The circular markers 410 in FIG. 4A are the determined windowed moving averages for the illustrated example. The slopes (e.g., gradients) of the windowed moving averages are calculated. The circular markers 420 in FIG. 4B are the calculated slopes for the example drilling acoustic signal illustrated in FIG. 4A. The most prominent variation in amplitude trend corresponds to the boundary between direct and reflected signals. For example, the highest peak of the amplitude trend slope (e.g., 420 in FIG. 4B) corresponds to the time boundary between direct and reflected drilling acoustic signals. The time at the highest peak ($t_{0-e}$ in FIG. 4B) of slope is the estimated time boundary between direct and reflected signals.

The time boundaries dividing the reflected signal sections can be determined based on the time boundary between the direct and reflected signals ($t_{0-e}$). The drilling acoustic signals before the time boundary ($t_{0-e}$) between direct and reflected signals are excluded from the evaluation of the windowed moving averages and time boundaries. The exclusion of the drilling acoustic signals before the time boundary ($t_{0-e}$) eliminates the influence of the direct signals on the first couples of windowed moving averages of the reflected signals. The elimination of the influence of the direct signals can increase the accuracy of the estimated time boundaries. The windowed moving averages and slopes can be determined for the rest of the data by using a window width that is narrower than the first used window width.

Effectiveness in defining boundaries by using windowed moving average technique is achieved by the balance between resolution and reliability. Resolution and reliability are controlled by window width. Larger window width can reveal better general trend, and thus more reliable results, but having a lower resolution (i.e. with larger error in the defined boundaries). Smaller window width can result in poorer general trend, thus less reliable results, but having higher resolution. A sensible window width, narrower than the width of the initial window used in defining $t_0$ can be chosen so that the boundaries can be effectively defined. The time at the highest peak of the slopes is the estimated first time boundary of the reflected signals. The following time boundary is estimated from the data excluding the signals before the last estimated time boundary. The procedure can be repeated until the time boundary between signals and noise is estimated.

In the example of FIG. 4A, all the time boundaries can be estimated in two steps. In the first step, with a relative wide window with, the time boundary between the direct and reflected signals, $t_{0-e}$, can be estimated. In the second step, based on applying a relatively narrow window, the remaining time boundaries can be estimated from the data excluding the data before $t_{0-e}$. In FIG. 4C, the square marker 430 indicates the windowed moving averages derived in the second step, and the square marker 440 in FIG. 4B mark the corresponding slopes. The time markers $t_{1\text{-}e}$ and $t_{2\text{-}e}$ correspond to the estimated first time boundary of reflected signals and the time boundary between the reflected signals and noises, respectively.

In another example approach for estimating time boundaries, the windowed moving averages and time boundaries are determined in one step by using a relatively narrow window. The highest peak corresponds to the estimated time boundary between the direct and reflected drilling acoustic signals. The rest of the estimated time boundaries can be determined one by one at the highest slop peak from the remaining data points.

The estimated time boundaries divide the reflected signals into reflected signal sections. Based on decided reflected signal sections, the two-way travel times can be calculated. If the error of the estimated time boundaries is insignificant, two way travel times can be directly calculated from the estimated time boundaries. Within the context example, the time span of an estimated reflected signal section, such as $t_{1\text{-}e}-t_{0\text{-}e}$, or $t_{2\text{-}e}-t_{1\text{-}e}$, correspond to the two-way travel time interval of the corresponding rock layer. The time difference between the estimated time boundary of a reflected signals and the estimated time boundary dividing the direct and reflected signals (i.e. $t_{0\text{-}e}$), such as $t_{1\text{-}e}-t_{0\text{-}e}$, or $t_{2\text{-}e}-t_{1\text{-}e}$, correspond to the two-way travel time between the corresponding rock boundary and the drill bit. The error of estimated time boundaries can be significant. The direct calculation of two-way travel times from the estimated time boundaries can result in significant error.

Two-way travel times can be most accurately calculated from the time lag between reflected signals to the correspondent direct signals. The time lag, i.e. the time difference between a reflected signal and the corresponding direct signal is the two-way travel time between the drill bit and the corresponding rock boundary. An easy and reliable solution to evaluate two way travel times can include finding the "true" exact corresponding direct signal section for a reflected signal section. The time lag between the two sections is the two-way travel time. For a given reflected signal section, the exact corresponding direct signal section can be determined. The exact corresponding direct signal section has the best resemblance, thus the best correlation, with the reflected signal section. The exact corresponding direct signal section of a reflected signal section can be accurately determined by using correlation between the signals in the reflected signal section and a series of estimated direct signal sections. Correlation can be quantitatively measured by the correlation coefficient between direct and reflected signals. The direct signal section which has the best correlation coefficient is the corresponding direct signal section.

Figure 5:
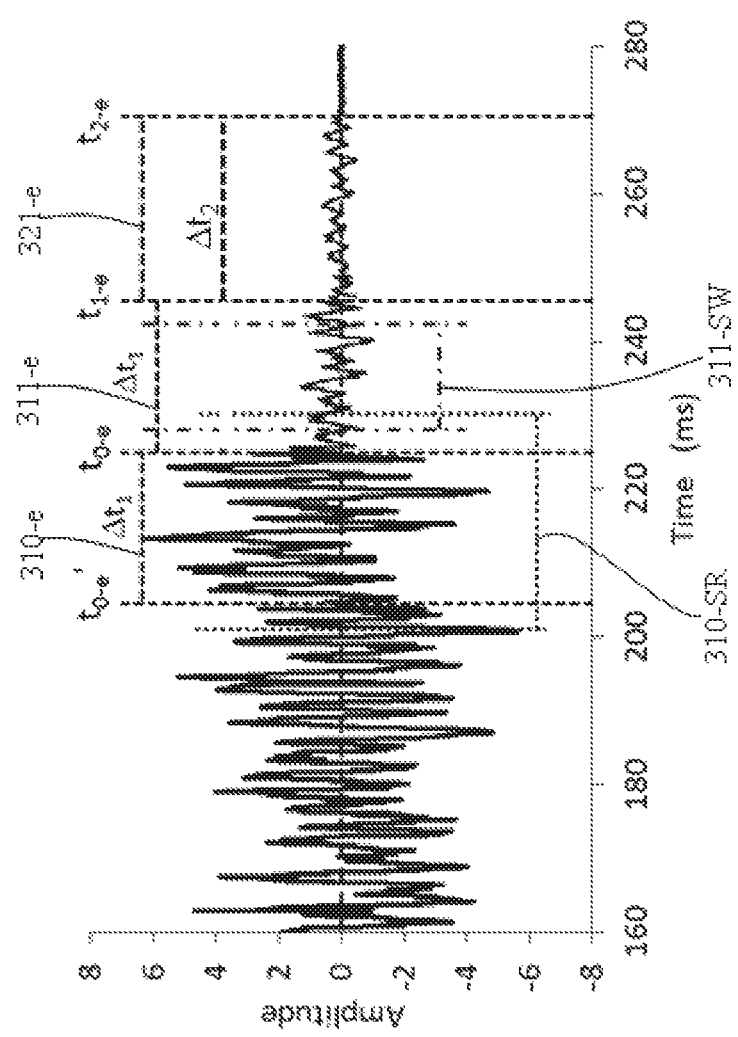
FIG. 5 illustrates an example method for evaluating two-way travel times.

FIG. 5 illustrates an example method for evaluating two-way travel times from the correlation between an estimated reflected signal sections and the corresponding direct signal sections. The sections bounded by the estimated time boundaries are the estimated reflected signal sections. The estimated sections 311-e and 321-e correspond to the reflected signal section 311 and 321 (FIG. 3), respectively. The time spans $\Delta t_1$ (between $t_{0\text{-}e}$ and $t_{1\text{-}e}$) and $\Delta t_2$ (between $t_{1\text{-}e}$ and $t_{2\text{-}e}$) correspond to the estimated reflected signal section 311-e and 321-e respectively. The corresponding direct signal section of an estimated reflected signal section has the same time span of the estimated reflected signal section and ends at the estimated boundary between direct and reflected signals. For example, the estimated direct signal section 310-e has the same time span ($\Delta t_1$) of the estimated reflected signal section 311-e and ends at $t_{0\text{-}e}$.

Some signals near the boundaries of an estimated reflected signal section can belong to the adjacent section. To check the correlation between a reflected signal section and its corresponding direct signals, only signals belonging to the reflected section are used. A new section significantly narrower than the estimated reflected section can be used as the representative reflected section. Within the representative section, all the signals belong to the "true" reflected signal section. That is, there are no signals within a representative reflected signal section belonging to the neighboring sections. The representative section is termed as "screening window." The screening window of an estimated reflected signal section is created by moving both boundaries of the section such a preselected distance (e.g., a quarter of the length of the reflected section) toward the middle so that the formed screening window is within the true reflected signal section. For example, 311-SW is a screening window of the estimated reflected signal section 311-e. A correctly selected screen window contains only signals of the true reflected signal section.

The determined screening window of an estimated reflected signal section is compared to the estimated corresponding direct signal section to evaluate the two-way travel time. Since there is error in the estimated boundaries, a section significantly wider than the estimated direct signal section is used to check the correlation. The new section is termed as "screening range." The screening range of an estimated direct signal section is wider than the estimated direct signal section to include the entire corresponding direct signal section of the screen window. For example, 310-SR is a determined screening range of the estimated direct signal section 310-e.

The two-way travel time of a reflected signal section can be accurately determined by screening the data within the screening range with the screening window frame by frame. A frame is separated from its adjacent neighbors by one data point. Each frame has the same time span, i.e., the same number of data points, as the screening window. The screening is conducted by calculating the correlation coefficient between signals of the screening window and those of a frame. Each time, when a frame is screened, the screening window is moved one data point forward to enter the next frame. If a frame is the corresponding direct signal section of the screening window, the correlation coefficient is the highest among all the calculated ones. That is, the frame with the highest correlation coefficient is the direct signal section of the screening window. The time difference between the decided corresponding frame and the screening window is the two-way travel time between the drill bit and the corresponding rock boundary.

False time boundaries can be generated if the window used in calculating the windowed moving average is too narrow. If a window that is too narrow is used, peaks reflecting local variation within a section can be generated. As the result, false time boundaries are assigned within sections. A falsely assigned time boundary can be detected when the corresponding estimated direct signal section is screened. For example, in FIG. 3, $t_3$ is assumed to be a false time boundary determined from the amplitude trend. Section 331 is the consequent false reflected signal section and section 330 is the false direct signal section. If $t_3$ was a real time boundary, then the reflected signals in the section 331 resembles the direct signals in the section 330.

In the illustrated example, $t_3$ is a false time boundary and signals in the section 331 are the first part of the signals in the section 321. The signals in the section 331 resemble the first part of the direct signals of the section 320 (which is the corresponding direct signal section of 321), not the direct signals in 330 which is the last part of the section 320. Since the reflected signals in the section 331 do not resemble the direct signals in the section 330, the assumed time boundary $t_3$ can be identified as being false when checked by the correlation between the reflected signals and the direct signals. Since the resemblance between reflected signals and direct signals are quantitatively indicated by corresponding correlation coefficient, false time boundaries can be detected by a proper correlation coefficient threshold and subsequently, false time boundaries can be eliminated.

The width of the screening window can be selected to be narrow enough, such that it contains only the signals of the true reflected signal section, and the screening range can be selected to be wide enough, such that it contains the corresponding direct signal section of the screen window. This way, the error in the estimated time boundaries does not affect the accuracy of the determined two-way travel times.

In some implementations, the signals recorded before drilling pause (e.g., in the direct signal section) are treated as direct signals, and signals within a reflected signal section as reflected by the corresponding rock boundary. A direct signal section can contain both direct and reflected signals. Although a direct signal section contains reflected signals, it is dominated by the direct signals. A reflected signal section can contain signals reflected by the corresponding rock boundary and also the boundaries below. In some implementations, the best correlation between direct and reflected signals can be used to find a time lag (e.g., a two-way travel time). The best correlation exists between the direct signals and the signals reflected from corresponding rock boundaries, not the signals reflected from the boundary below. The treatment in the above implementations does not affect the accuracy of the two-way travel time derivation.

Figure 6:
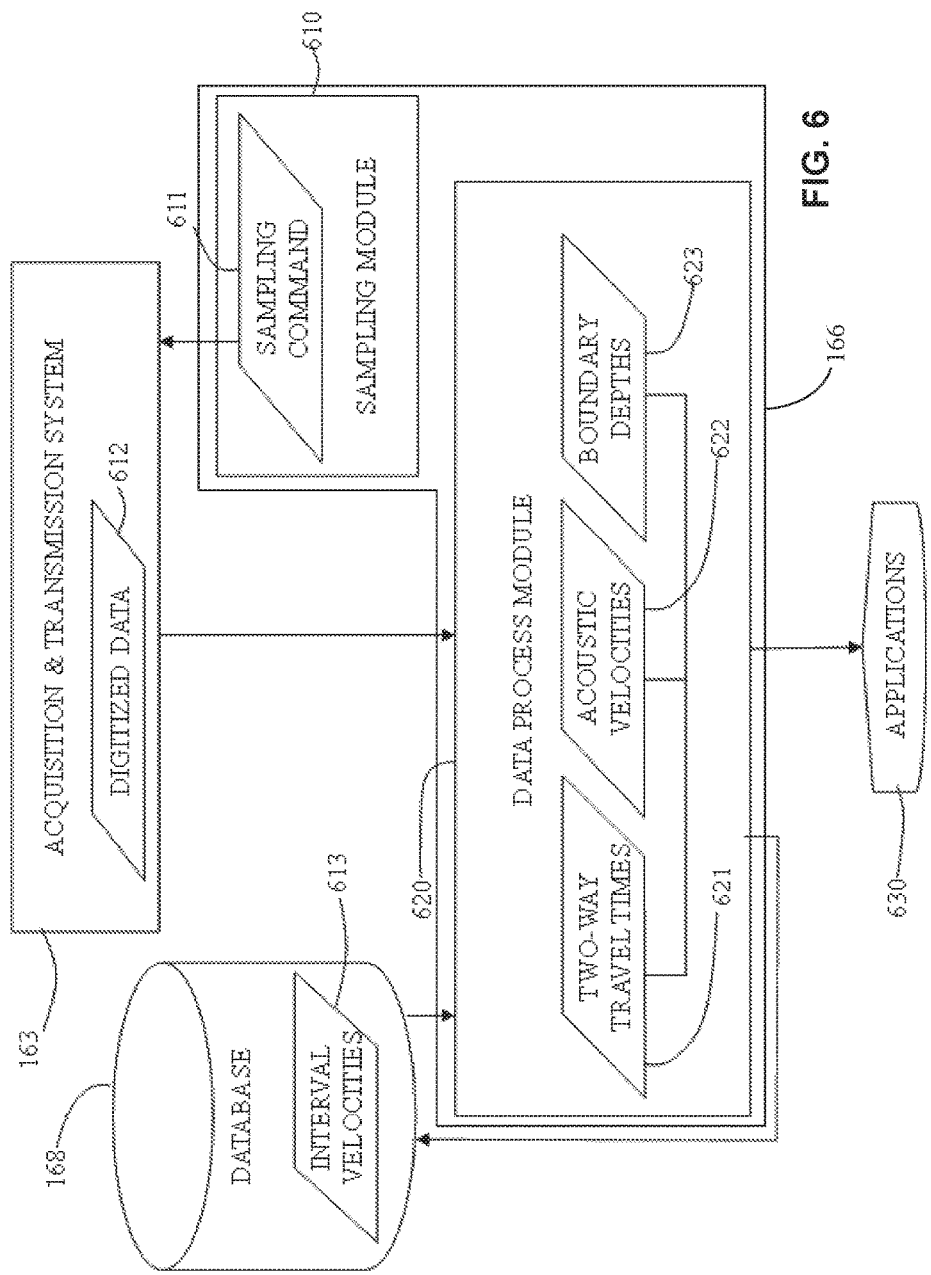
FIG. 6 illustrates an example system for determining rock boundaries and rock acoustic velocities.

FIG. 6 illustrates an example system for determining two-way travel times, rock boundaries and rock acoustic velocities from the drilling acoustic signals recorded before and after a drilling pause. The example system of FIG. 6 can include a rock properties analyzing program 166, an acquisition and transmission system 163, a database 168 and one or more applications 630. The rock properties analyzing program 166 can includes a sampling module 610, a data process module 620. The sampling module 610 can perform the process of generating a sampling command 611. For example, before the drilling is paused or stopped, the sampling module 610 of the rock properties analyzing program 166 (also in FIG. 1D) can generate a sampling command 611 that is transmitted to the acquisition and transmission system, 163 (also illustrated in FIG. 1D).

The sampling command can include the starting time of recording, the ending time of recording, and the sampling rate at which the analog drilling acoustic signals detected by the acoustic sensors (e.g., sensors 150 or 155 illustrated in FIG. 1D) are sampled and digitized. In some implementations, the starting times can be in the range of seconds or minutes before the drilling is paused. The time span between the starting time and the time at which the drilling is paused is at least twice longer than the span between the ending time and the time at which the drilling is paused. The ending time depends on the depth of the last detectable rock boundary. The deeper is the last rock boundary, the longer the required detection time is. Usually 2 seconds after drilling is being paused are sufficient to record a significant majority or all reflected drilling acoustic signals that can be separated from background noise.

When the acquisition and transmission system 163 receives the sampling command 611, it starts to act according to the sampling command 611 by sampling and digitizing the analogue data detected up by the acoustic sensors. The output data is transmitted from the acoustic sensors to the data acquisition unit of the acquisition and transmission system 163 by the data transmission system of the acquisition and transmission system 163. The analogue data is sampled and digitized by the data acquisition unit. The digitized data 612 is then transmitted to the data process module 620 to be processed. The digitized data can be in time domain format, as illustrated in FIG. 3B.

The data process module 620 can process the digitized data 612 to determine two way travel times 621, acoustic velocities 622 and boundary depths 623 for detectable rock boundaries. The interval velocities (e.g., acoustic velocities of a rock layer) 613 of the same rock layers from offset wells, which are stored in a database 168, can be used to determine the boundary depths. The determined two-way travel times 621, acoustic velocities 622, and boundary depths 623 can be used in various applications 630, such as well drilling planning, determination of the optimum location for casing shoe, best production zones for petroleum production, construction of interval velocity grid for a given field, seismic data processing and interpretation, etc. The determined results can be stored in the database 168.

Figure 7:
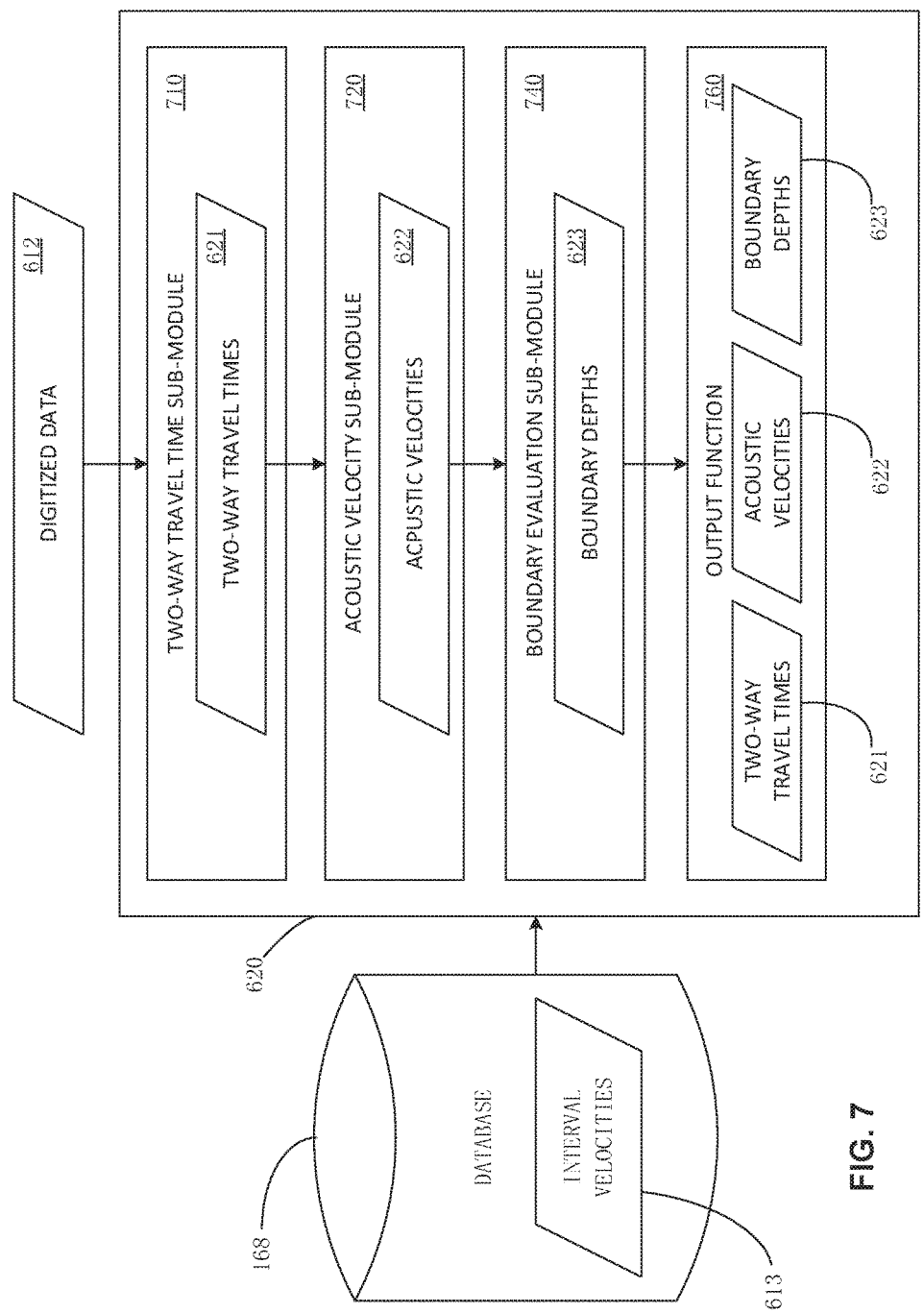
FIG. 7 illustrates a data processing procedure performed by the data process module 620 for evaluating rock boundaries and rock acoustic velocities.

FIG. 7 illustrates an example data processing procedure performed by the data process module 620, which includes a two-way travel time sub-module 710, an acoustic velocity sub-module 720, a boundary evaluation sub-module 740, and an output function 760. In some implementations, when the data process module 620 receives the digitized data 612, the digitized data 612 is analyzed by the two-way travel time sub-module 710. In some examples, the two-way travel time sub-module 710 can perform the process of determining the two-way travel times 621 for all the detectable boundaries. The output of the two-way travel time sub-module 710 is transmitted to the acoustic velocity sub-module 720. In some examples, the acoustic velocity sub-module 720 can perform the process of determining the acoustic velocities 622 of the drilled rock layer from the determined two-way travel times and other information. The output of the acoustic velocity sub-module 720 is transmitted to the boundary evaluation sub-module 740. In some examples, boundary evaluation sub-module 740 can perform the process of determining the depths of rock boundaries 623, based on the two-way travel times 621, calculated acoustic velocities 622 or interval velocities 613 borrowed from offset wells. The determined results are transmitted to other components of the system (e.g., as illustrated in FIG. 6) by the output function 760.

Figure 8:
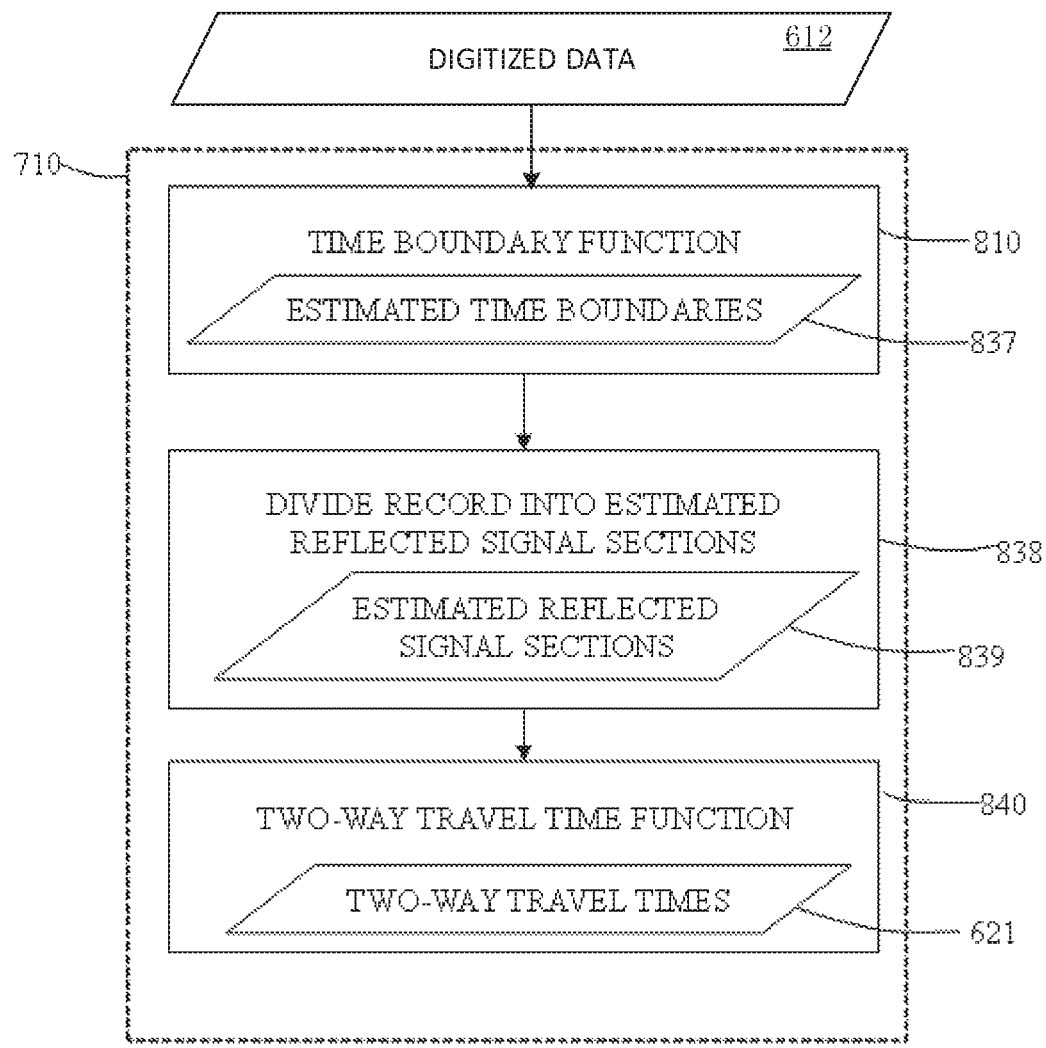
FIG. 8 illustrates a flowchart of an example process for determining the two-way travel times.

FIG. 8 illustrates an example process for determining the two-way travel times. The example process illustrated in FIG. 8 can be executed by the two-way travel time sub-module 710, described with reference to FIG. 7. At 810, digitized data 612 are received and processed by a time boundary function. The output of the time boundary function can include estimated time boundaries 837. At 838, the record (e.g., the digitized data 612) is divided by the estimated time boundaries 837 into estimated reflected signal sections 839. At 840, the estimated reflected signal sections 839 and the digitized data 612 are processed by a two-way travel time function. The two-way travel time function can determine the two-way travel times 621.

Figure 9:
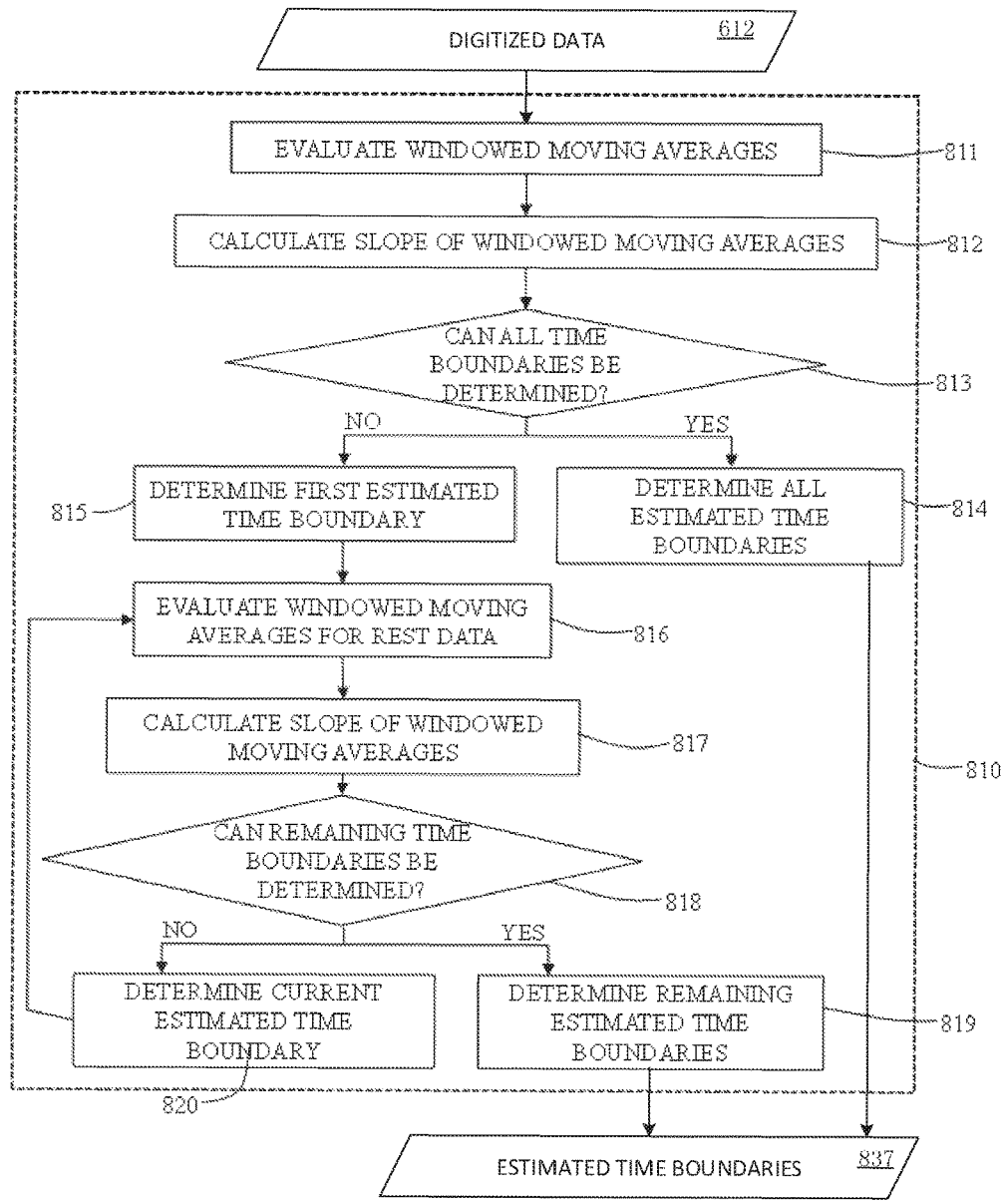
FIG. 9 illustrates a flowchart of an example process for determining the estimated time boundaries.

FIG. 9 illustrates an example process for determining estimated time boundaries. The example process illustrated in FIG. 9 can be executed by the two-way travel time sub-module 710, described with reference to FIG. 7. At 811, the time boundary function 810 can evaluate windowed moving averages of the amplitude of the digitized data set 612 by using a window width covering 2-4 amplitude peaks, or other suitable window width. At 812, the slope of the windowed moving averages is calculated. If a relatively narrow window is used, all the estimated time boundaries can be determined. At 813, it is identified whether all time boundaries can be determined. If all time boundaries can be determined, at 814, the estimated time boundaries are determined one by one. Each estimated time boundary corresponds to the current highest peak of the slope of the windowed moving averages. The current highest peak is the highest peak among the remaining slope data points after the last highest peak.

If a relatively wide window is used, it is difficult to determine all the estimated time boundaries. At 815, the first estimated time boundary (the boundary between direct and reflect signals) is determined based on identifying that it is difficult to determine all the estimated time boundaries. The first estimated time boundary is the time at the highest peak of the slope of the windowed moving averages. At 816, windowed moving averages for the rest data, which is the data after the last estimated time boundary, are determined by using a relatively narrow window width. At 817, the slopes are calculated from the windowed moving averages determined in the step 816. At 818, it is decided whether the remaining time boundaries can be determined. If possible, at 819, the estimated time boundaries are determined one by one. Each estimated time boundary corresponds to the current highest peak of the slope of the windowed moving averages. A current highest peak is the highest peak among the remaining slope data points after the last highest peak. At 820, based on identifying that it is difficult to determine all the remaining estimated time boundaries, the current time boundary, which is the time at the highest peak of the slope of the windowed moving averages, is determined. The process can be repeated from step 816 until all the estimated time boundaries 837 are determined.

Figure 10:
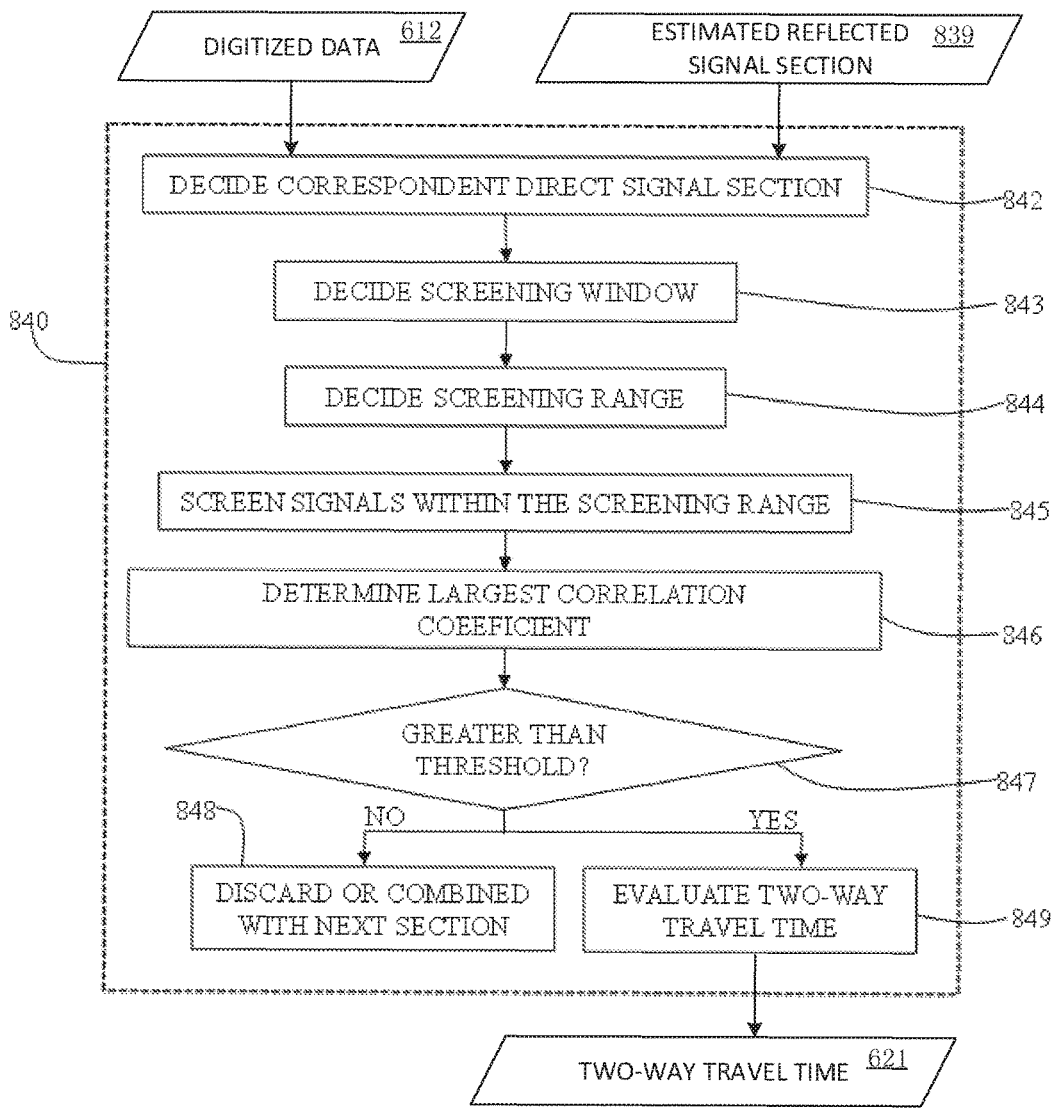
FIG. 10 illustrates an example two-way travel time function.

FIG. 10 illustrates an example two-way travel time function 840 that can define the correspondence between the direct signal and the reflected signal. The example process illustrated in FIG. 10 can be executed by the two-way travel time sub-module 710, described with reference to FIG. 7. The two-way travel time function 840 can receive digitized data 612 and an estimated reflected signal section 839. At 842, the two-way travel time function 840 selects the corresponding direct signal section based on the given estimated reflected signal section 839. The corresponding direct signal section has the same time span as the estimated reflected signal section 839 and ends at the estimated time boundary between direct and reflected signal.

At 843, the function 840 selects a screening window. The width of the screening widow can be selected to be narrower than the estimated reflected signal section 839 such that the screening widow only contains the signals of the true section (e.g., the screening widow does not contains signals from adjacent sections). At 844, the screening range is selected. The screen range can contain the selected direct signal section and it can be wider than the direct signal section, such that it contains the corresponding direct signals of the selected screening window. At 845, signals within the screening range are screened. Screening is carried out frame by frame. A frame is separated from its neighbor by one data point. Each frame has the same time span, thus same number of data points, as the screening window. The screening is conducted by calculating the correlation coefficient between signals of the screening window and those of a frame. Each time, when a frame is screened, the screening window is moved one data point forward to enter the next frame. A set of correlation coefficients is generated when the screening is completed.

At 846 the largest correlation coefficient is determined. At 847, the largest correlation coefficient is compared to a preset threshold. If the largest correlation coefficient is less than the threshold, the lower time boundary of the estimated reflected signal section is considered to be false. In some implementations, based on determining that the largest correlation coefficient is less than the threshold, the estimated reflected section is discarded, and another estimated section is processed by the process 840. In other implementations, based on determining that the largest correlation coefficient is less than the threshold, the current estimated reflected section is combined with the next estimated reflected section to become part of the next estimated reflected section.

If the largest correlation coefficient is greater than the threshold, the estimated lower time boundary is considered to be real (e.g., a rock boundary corresponds to the estimated lower time boundary). At 849, the two-way travel time 621 between the drill bit and the corresponding rock boundary is calculated as the time difference between the frame with the highest correlation coefficient and the screening window. Each estimated section within the record (e.g., the digitized data 612) is processed by the two-way travel time function 840 to determine the two-way travel time 621. When all the two-way travel times are evaluated, an interval two-way travel time for a rock layer can be calculated just by deducting the preceding two-way travel time from the current one.

Figure 11A:
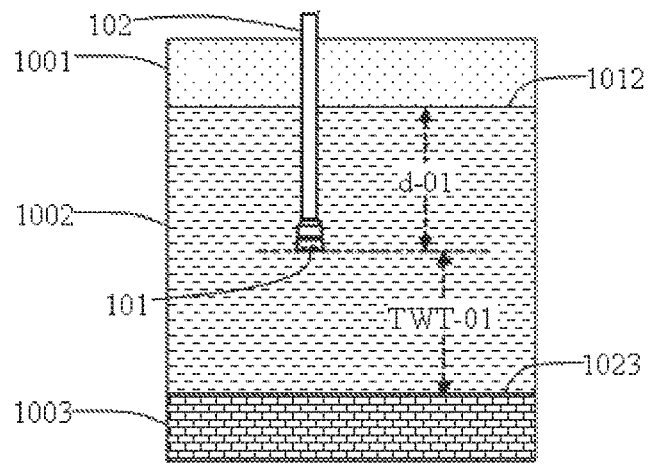
FIGS. 11A-11C illustrate schematic diagrams showing systems for determining rock acoustic velocities.
Figure 11B:
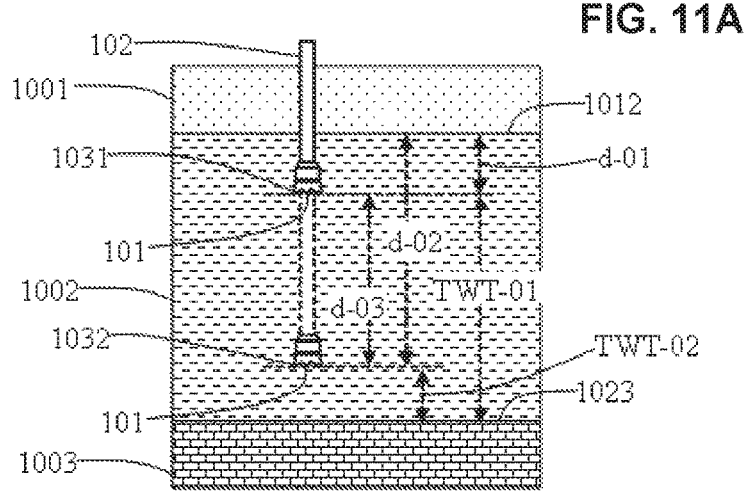
Figure 11C:
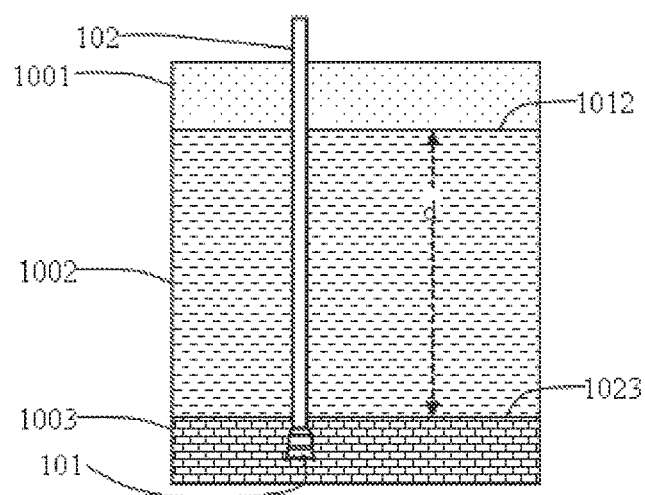

FIGS. 11A-11C are schematic diagrams showing systems for determining rock acoustic velocities in different subterranean formations. When drilling pauses at a particular location within a subterranean formation, the acoustic velocity between the upper boundary 1012 and the drill bit 101 for the rock layer within which the drilling is paused can be determined. The acoustic velocity is:

$$V = \frac{2 \times d}{ITWT - TWT} \qquad \text{(Equation 1)}$$

In the above equation, V denotes the acoustic velocity between the upper boundary and the drill bit, $LT^{-1}$; d denotes the distance between the upper boundary and the drill bit, L; ITWT denotes the interval two-way travel time of the rock layer, T; TWT denotes the two-way travel time between the drill bit and the lower boundary, T. For the example in the FIG. 11A; d-01 is d, and TWT-01 is TWT and is determined when the drilling is paused. The interval two-way travel time is determined when the drilling is paused above the upper rock boundary 1012.

When drilling is paused more than once within a rock layer, such as illustrated by FIG. 11B, more than one acoustic velocity can be evaluated. The acoustic velocity between the upper rock boundary and any drill bit position at which the drilling is paused, acoustic velocity between any two drill bit positions at which the drilling is paused can be calculated. For the example three following acoustic velocities can be evaluated: acoustic velocity between the upper boundary 1012 and the drilling bit position 1031 or 1032, acoustic velocity between drilling bit position 1031 and 1032. The first two acoustic velocities between the upper rock boundary and the drill bit are calculated from the corresponding two-way travel times and the distance between the upper boundary 1012 and the drill bit (e.g., from the following numbers: d-01, TWT-01, ITWT, d-02 and TWT-02). The acoustic velocity between two drill bit positions within a rock layer is:

$$V = \frac{2 \times d}{TWT_1 - TWT_2} \quad \text{(Equation 2)}$$

In the above equation, V denotes the acoustic velocity between two the drill bit positions, $LT^{-1}$; d denotes the distance between the two drill bit positions, L; $TWT_1$ denotes the two-way travel time between the upper drill bit position and the lower rock boundary, T; $TWT_2$ denotes the two-way travel time between the lower drill bit position and the lower rock boundary, T. For the example in FIG. 11B; d-03 is d, TWT-01 is $TWT_1$ and TWT-02 is $TWT_2$.

When a rock layer is drilled through, such as illustrated by FIG. 11C, the interval acoustic velocity for the rock layer can be calculated by dividing the thickness of the rock layer by half of the interval of the two-way travel time. If more than one acoustic velocity for a rock layer has been evaluated, an averaged acoustic velocity can be calculated. In some implementations, at least one acoustic velocity (e.g., the interval velocity for a rock layer) can be determined. The determined rock acoustic velocities can be saved into a database (e.g., database 168 described with reference to FIG. 1A-1D and FIG. 6) for future use.

Figure 12:
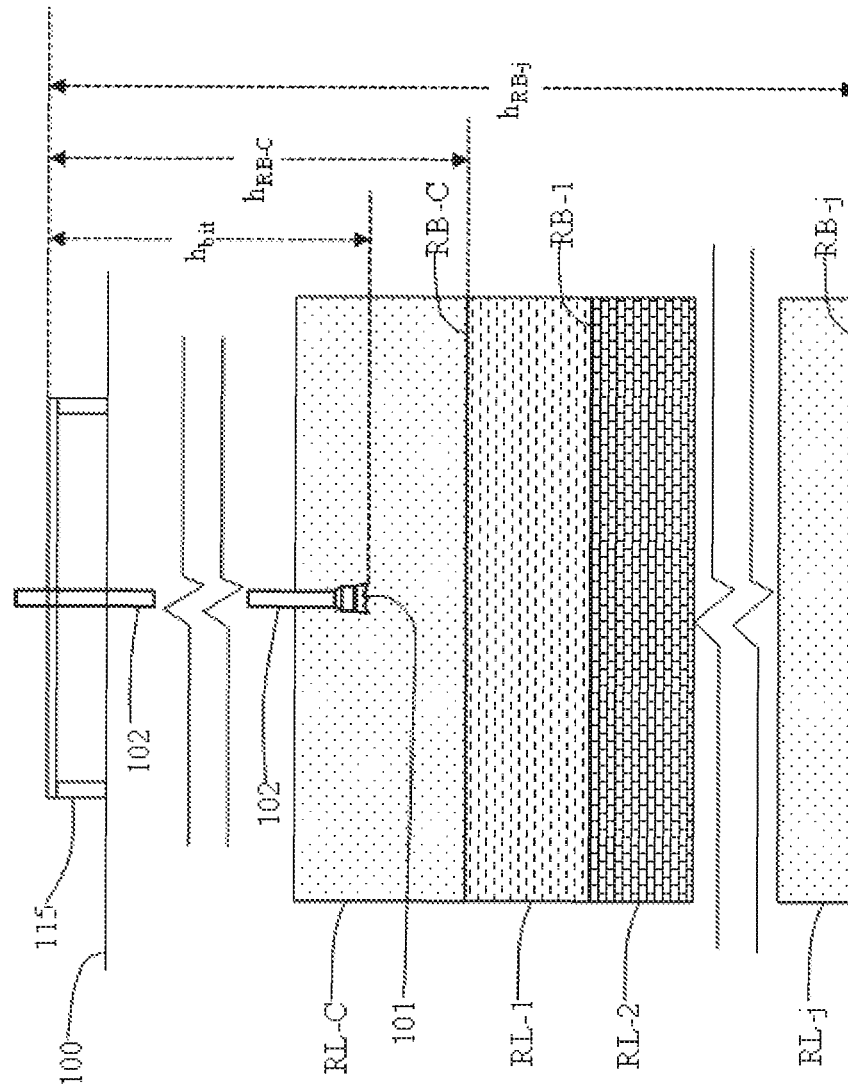
FIG. 12 illustrates a schematic diagram showing a system for determining a boundary depth.

FIG. 12 is a schematic diagram showing a system for determining a boundary depth. The drilling platform 115, illustrated in FIG. 12, can be used as the datum for depth. The platform 115 can be above ground level 100 or sea level 100. For clarity, the rock layer within which the drilling is currently paused is denoted as Rock Layer C (RL-C). The first rock layer below the RL-C is denoted as RL-1, the second rock layer is denoted as RL-2 and the $j^{th}$ rock layer is denoted as RL-j. The corresponding lower boundary of the rock layer is denoted as RB-C, RB-1, RB-2, . . . , RB-j, respectively. The depth of boundaries is correspondingly denoted as $h_{RB-C}$, . . . , $h_{RB-j}$, respectively.

The depth $h_{bit}$ of the drill bit 101 is known during drilling. When drilling is paused within the rock layer RL-C, interval two-way travel times for all the detectable the rock layers beneath the drill bit 101 can be evaluated. The acoustic velocity ($V_c$) between the upper boundary of the rock layer RL-C and the drill bit 101 can be evaluated. The depth $h_{RB-C}$ of the rock boundary RB-C is determined from the two-way travel time ($TWT_C$) between the drill bit and the rock boundary RB-C and the determined rock velocity ($V_c$) or a velocity imported from the database (e.g., database 168 described with reference to FIG. 1D and FIG. 6 or FIG. 7):

$$h_{RB-c} = h_{bit} + \frac{TWT_c}{2} V_c \quad \text{(Equation 3)}$$

or, $$h_{RB-c} = h_{bit} + \frac{TWT_c}{2} V_{DB-c} \quad \text{(Equation 4)}$$

Where, $V_{DB-c}$ denotes the acoustic velocity imported from the database 168 (FIG. 7) for the rock layer RL-C. The depth of a rock boundary RB-j under the drill bit is:

$$h_{RB-j} = h_{RB-c} + \sum_{i=1}^{j} \frac{ITWT_i}{2} V_{DB-i} \quad \text{(Equation 5)}$$

Where, $ITWT_i$ denotes the interval two way travel time of a rock layer RL-i; $V_{DB-i}$ denotes a velocity imported from the database 168 for the rock layer RL-i.

Figure 13:
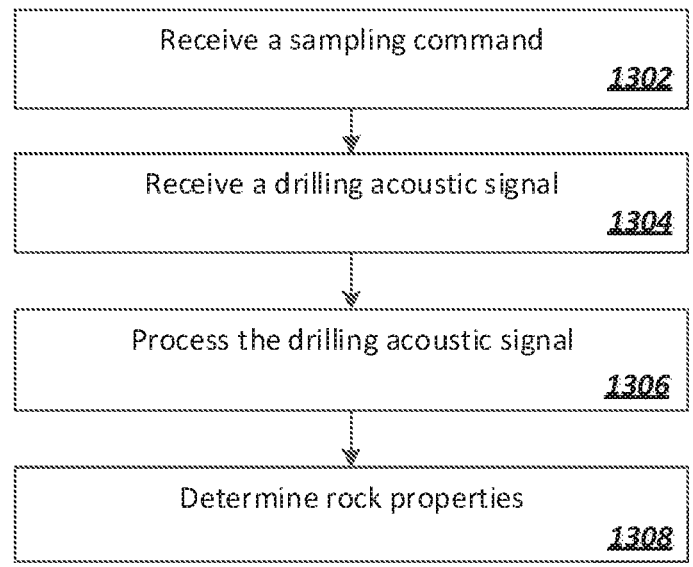
FIG. 13 illustrates an example process for determining rock properties.

FIG. 13 illustrates an example process 1300 for determining rock properties, such as rock layer boundaries and rock acoustic velocities. The example process 1300 can be executed by the example computer (e.g., computer 164 of FIG. 1), data process module (e.g., data process module 620 described with reference to FIG. 6) or a system (e.g., system 1520 described with reference to FIG. 14). At 1302, a sampling command generated by a sampling module is received. The sampling command can include the starting time of recording, the ending time of recording, and the sampling rate at which the analog drilling acoustic signals detected by the acoustic sensors (e.g., sensors 150 or 155 illustrated in FIG. 1D) are sampled and digitized. At 1304, drilling acoustic signals are received from the acquisition and transmission system, being recorded, sampled and digitized according to the sampling command. At 1306, the drilling acoustic signals are processed. The data processing can include, filtering techniques, correlation methods and other functions based on the properties of acoustic signal propagation in rock formation, as described with reference to FIGS. 6-12. The output of the drilling acoustic signal processing can include two way travel times. At 1308, the output of the drilling acoustic signal processing is used to determine rock properties, including acoustic velocities and boundary depths. The determined rock properties can be used in various applications, such as well drilling planning, determination of the optimum location for casing shoe and best production zones for petroleum production, construction of interval velocity grid for a given field which can be used in seismic data processing and drilling interpretation.

Figure 14:
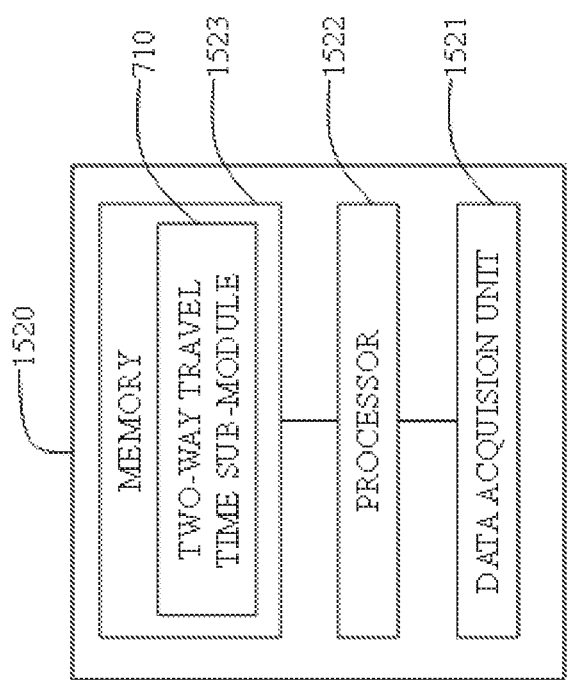
FIG. 14 illustrates an example diagram of a processor assembly.

FIG. 14 illustrates an example diagram of a processor assembly 1520 of the example system 100C. In some implementations, the processor assembly 1520 can include multiple components such as, a data acquisition unit 1521, an electronic processor 1522, and a memory 1523 contained within, carried by, or otherwise operably coupled with the electronic processor 1522, and the two-way travel time module (e.g., two-way travel time sub-module 710 in FIGS. 7 and 8) installed therein the memory 1523.

According to the example configuration of the example system 100C (FIG. 1C), the borehole telemetry system 1530 is composed of a downhole telemetry system interface 1531, a borehole telemetry medium, and a surface telemetry system interface 1532. The downhole telemetry system interface 1531 is contained within the sensor subassembly 1540; the surface telemetry system interface 1532 is located at the stationary part of the top drive 104 or the drilling rig 11. The downhole telemetry system interface 1531 is connected to the downhole processor assembly 1520 through the downhole encoder/decoder 1515. When the borehole telemetry system interface 1531 receives encoded binary data, it transmits the data to the surface telemetry system interface 1532 through a borehole telemetry medium, which is the drilling mud contained in the drill string inner bore in case a mud pulse telemetry system is used, for example. Utilization of other borehole telemetry media is/are, however, within the scope of the present invention.

According to the configuration of the example system 100C (FIG. 1C), during drilling operation, both direct and reflected drilling acoustic signals travel from the drill bit 101 upwards and reach to the acoustic sensors 1550. At a short time (a few seconds to a few minutes) before drilling is paused, the sampling module 610 (FIG. 6) of the computer program 1566 (FIG. 1C) sends a sampling command to the data acquisition unit 1521 through the encoder/decoder 1563. The encoder/decoder 1563 encodes the sampling command into binary data. The binary data is transmitted to the encoder/decoder 1515 by the borehole telemetry system 1530. The downhole encoder/decoder 1515 decodes the binary data back into the sampling command and transmits it to the data acquisition unit 1521. The sampling command specifies the start and end time, and the sampling rate for the data acquisition unit 1521 to sample and digitize the drilling acoustic signals picked up by the acoustic sensors 1550 to generate digitized data 612 (FIG. 6).

The digitized data 612 is processed by the two-way travel time sub-module 710 (FIG. 14) for two-way travel times (FIGS. 8, 9 and 10). The determined two-way travel times are transmitted upwards to the computer 164 through firstly the encoder/decoder 1515. The encoder/decoder 1515 encodes the two-way travel times into binary data. The binary data is transmitted to the encoder/decoder 1563 by the borehole telemetry system 1530. The encoder/decoder 1563 decodes the binary data back into the two-way travel times and transmits it to the computer 164. The two-way travel times are processed by the computer program 1566 to determine the rest of results: acoustic velocities and boundary depths. All the determined results can be stored in the database 168.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor can receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations have been described. Nevertheless, it will be understood that various modifications can be made without departing from the spirit and scope of the disclosure.

The invention claimed is:

1. A computer-implemented method comprising:
receiving an acoustic signal produced in response to a well tool contacting a portion of a subterranean zone during a well operation, the acoustic signal comprising a source acoustic signal and a reflected acoustic signal, the reflected acoustic signal produced in response to the source acoustic signal, wherein sound is produced before a pause of the well operation performed independently from a recording of the acoustic signal, the recording starting before the pause and continuing during a portion of the pause;
processing the acoustic signal to determine the source acoustic signal and the reflected acoustic signal; and
determining properties of the subterranean zone based on a correspondence between the source acoustic signal and the reflected acoustic signal and based on the pause of the well operation.

2. The method of claim 1, wherein the well tool is a drilling tool to drill into the subterranean zone.

3. The method of claim 1, further comprising receiving a sampling command generated by a sampling module.

4. The method of claim 3, wherein the sampling command comprises a start time for starting the recording of the acoustic signal, an end time for ending the recording of the acoustic signal and a sampling rate, the start time being before the pause and the end time being after the pause.

5. The method of claim 4, wherein the start time is a minute before the pause and the end time is 2 seconds after the beginning of the pause.

6. The method of claim 1, wherein the properties of the subterranean zone comprise depths of rock boundaries and acoustic rock velocities.

7. The method of claim 1, wherein determining properties of the subterranean zone comprises determining a plurality of two-way travel times corresponding to a propagation of the sound from the oil well tool, to a plurality of rock boundaries and back to an acoustic sensor.

8. A method comprising:
producing, by a well tool drilling a wellbore in a subterranean formation, an acoustic signal responsive to the drilling, wherein a first portion of the acoustic signal is reflected off a first subterranean formation boundary downhole of the well tool and a second portion of the acoustic signal is reflected off a second subterranean formation boundary downhole of the first subterranean formation boundary;
pausing the drilling after producing the acoustic signal;
receiving, after the pausing and at the well tool, the first portion of the acoustic signal and the second portion of the acoustic signal; and
determining properties of the subterranean formation based on the first portion of the acoustic signal and the second portion of the acoustic signal.

9. The method of claim 8, wherein determining properties of the subterranean formation comprises determining a plurality of two-way travel times corresponding to a propagation of the acoustic signal from the well tool, to a plurality of rock boundaries downhole of the well tool and uphole to an acoustic sensor.

10. The method of claim 9, wherein determining the plurality of two-way travel times comprises:
determining a plurality of time boundaries by processing the acoustic signal with a time boundary function;
determining a plurality of sections of the second portion of the acoustic signal based on the plurality of time boundaries; and
processing the plurality of sections of the second portion of the signal sections with a two-way travel time function to provide the plurality of two-way travel times.

11. The method of claim 10, wherein the time boundary function comprises:
determining a plurality of window moving averages, each of the plurality of window moving averages corresponding to a sequential section of the acoustic signal;
determining a slope of an amplitude of the acoustic signal based on the plurality of window moving averages;
identifying that each of the time boundaries can be determined; and
based on identifying that each of the time boundaries can be determined, determining each of the time boundaries by sequentially identifying local maxima of the slope.

12. The method of claim 11, wherein each of the plurality of window moving averages comprises an average amplitude of the sequential section of the acoustic signal.

13. The method of claim 10, wherein the two-way travel time function comprises:
selecting a corresponding direct signal section within the first portion of the acoustic signal;
selecting a size of a screening window;
selecting a screening range within the second portion of the acoustic signal;
screening the screening range using the size of the screening window, to determine a plurality of correlation coefficients; and
identifying a largest correlation coefficient of the plurality of correlation coefficients.

14. A system comprising:
a wellbore drilling tool configured to receive a plurality of acoustic signals produced in response to the wellbore drilling tool drilling a wellbore in a subterranean formation, the plurality of acoustic signals including a first reflected acoustic signal reflected off a first subterranean formation boundary downhole of the wellbore drilling tool and a second reflected acoustic signal reflected off a second subterranean formation boundary downhole of the first subterranean formation boundary responsive to a drilling sound produced during drilling the wellbore, at least a portion of the plurality of acoustic signals received after a pause in drilling the wellbore after the drilling sound is produced;
one or more computer systems in communication with the wellbore drilling tool; and
a computer-readable medium storing instructions executable by the one or more computer systems to perform operations comprising:
determining properties of the subterranean formation based on the plurality of reflected acoustic signals.

15. The system of claim 14, wherein the wellbore drilling tool is configured to drill into the subterranean zone.

16. The system of claim 14, wherein the wellbore drilling tool is further configured to receive a sampling command generated by a sampling module.

17. The system of claim 16, wherein the sampling command comprises a start time for starting a recording of an acoustic signal of the plurality of acoustic signals, an end time for ending the recording of the acoustic signal and a sampling rate, the start time being before the pause and the end time being after the pause.

18. The system of claim 17, wherein the start time is a minute before the pause and the end time is 2 seconds after the beginning of the pause.

19. The system of claim 14, wherein the properties of the subterranean zone comprise depths of rock boundaries and acoustic rock velocities.

20. The system of claim 14, wherein the computer-readable medium is configured to determine the properties of the subterranean zone by determining a plurality of two-way travel times corresponding to a propagation of the sound from the oil well tool, to a plurality of rock boundaries and back to an acoustic sensor.

* * * * *